US012413656B1

(12) United States Patent
Bar-Niv et al.

(10) Patent No.: US 12,413,656 B1
(45) Date of Patent: *Sep. 9, 2025

(54) COMMUNICATION OF SENSOR DATA IN A MOTOR VEHICLE COMMUNICATION NETWORK

(71) Applicant: Marvell Asia Pte Ltd, Singapore (SG)

(72) Inventors: Amir Bar-Niv, Sunnyvale, CA (US); Dance Wu, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,976

(22) Filed: Aug. 28, 2023

Related U.S. Application Data

(63) Continuation of application No. 17/500,838, filed on Oct. 13, 2021, now Pat. No. 11,743,366.

(60) Provisional application No. 63/091,282, filed on Oct. 13, 2020.

(51) Int. Cl.
*H04L 69/22* (2022.01)
*H04L 12/46* (2006.01)
*H04L 65/65* (2022.01)
*H04N 21/854* (2011.01)
*H04W 4/40* (2018.01)

(52) U.S. Cl.
CPC .......... *H04L 69/22* (2013.01); *H04L 12/4645* (2013.01); *H04L 65/65* (2022.05); *H04N 21/85403* (2013.01); *H04N 21/85406* (2013.01); *H04W 4/40* (2018.02)

(58) Field of Classification Search
CPC ..... H04L 12/4645; H04L 65/65; H04L 69/22; H04N 21/85403; H04N 21/85406; H04W 4/40

USPC .......................................................... 709/224
See application file for complete search history.

(56) References Cited

U.S. PATENT DOCUMENTS

| | | | |
|---|---|---|---|
| 9,491,495 B2 * | 11/2016 | Bohm | H04L 25/4904 |
| 10,827,147 B1 | 11/2020 | Briercliffe | |
| 11,743,366 B1 * | 8/2023 | Bar-Niv | H04L 12/4645 709/224 |
| 2002/0101842 A1 * | 8/2002 | Harrison | H04L 12/4625 370/392 |
| 2004/0170175 A1 | 9/2004 | Frank et al. | |
| 2006/0031889 A1 | 2/2006 | Bennett et al. | |
| 2006/0291452 A1 * | 12/2006 | Velagaleti | H04L 1/1671 370/352 |

(Continued)

OTHER PUBLICATIONS

Boatright, "Understanding IEEE 1722 AVB Transport Protocol—AVBTP," IEEE 802.1 Plenary (Mar. 2009) 33 pages.

(Continued)

*Primary Examiner* — David P Zarka

(57) ABSTRACT

In a vehicular communication network, a processor receives a packet that includes data corresponding to a sensor, the packet being in a first format. The processor reformats the packet in the first format to a second format different than the first format. The reformatting of the packet includes the processor generating an intermediate frame that includes a header in the second format and a payload in the second format, the payload including the data corresponding to the sensor. The processor provides the frame to an Ethernet network interface, which encapsulates the frame in an Ethernet packet. The Ethernet network interface then transmits the Ethernet packet via an Ethernet link.

22 Claims, 7 Drawing Sheets

(56) References Cited

U.S. PATENT DOCUMENTS

| | | | |
|---|---|---|---|
| 2012/0002683 A1 | 1/2012 | You et al. | |
| 2012/0329420 A1 | 12/2012 | Zotti et al. | |
| 2013/0094545 A1* | 4/2013 | Park | H04N 21/438 375/295 |
| 2013/0179029 A1* | 7/2013 | Wang | B60K 35/00 701/32.7 |
| 2014/0269259 A1* | 9/2014 | Vvr | H04L 12/2898 370/221 |
| 2015/0195137 A1* | 7/2015 | Kashyap | H04L 41/0893 370/254 |
| 2016/0212456 A1* | 7/2016 | Bohm | H04N 21/23602 |
| 2017/0117979 A1* | 4/2017 | Sengoku | H04J 3/0605 |
| 2017/0289214 A1 | 10/2017 | Cho et al. | |
| 2018/0063218 A1 | 3/2018 | Kim et al. | |
| 2018/0145848 A1* | 5/2018 | Seo | H04N 21/41422 |
| 2018/0159785 A1* | 6/2018 | Wu | H04J 3/1658 |
| 2018/0213270 A1 | 7/2018 | Ng | |
| 2019/0058613 A1 | 2/2019 | Maeda et al. | |
| 2019/0149751 A1* | 5/2019 | Wise | H04N 7/08 348/222.1 |
| 2021/0160163 A1* | 5/2021 | Gray | H04L 69/22 |
| 2021/0170945 A1 | 6/2021 | Sagar et al. | |
| 2021/0409323 A1* | 12/2021 | Menon | H04L 12/46 |
| 2022/0217310 A1 | 7/2022 | Matsubara et al. | |
| 2023/0336406 A1* | 10/2023 | Iwaki | H04L 12/4641 |
| 2024/0040407 A1* | 2/2024 | Debenedetti | H04L 41/0659 |
| 2025/0023663 A1* | 1/2025 | Hyakudai | H04L 1/0046 |

OTHER PUBLICATIONS

"CYUSB306X, EZ-USB CX3: MIPI CSI-2 to SuperSpeed USB Bridge Controller," Cypress Semiconductor Corp., Doc. No. 001-87516 Rev. * L, Jun. 22, 2017 (38 pages).

"DS90UB953-Q1 FPD-Link III 4.16-Gbps Serializer With CSI-2 Interface for 2.3MP/60fps Cameras, RADAR, and Other Sensors," Texas Instruments, Sep. 2018 (91 pages).

* cited by examiner

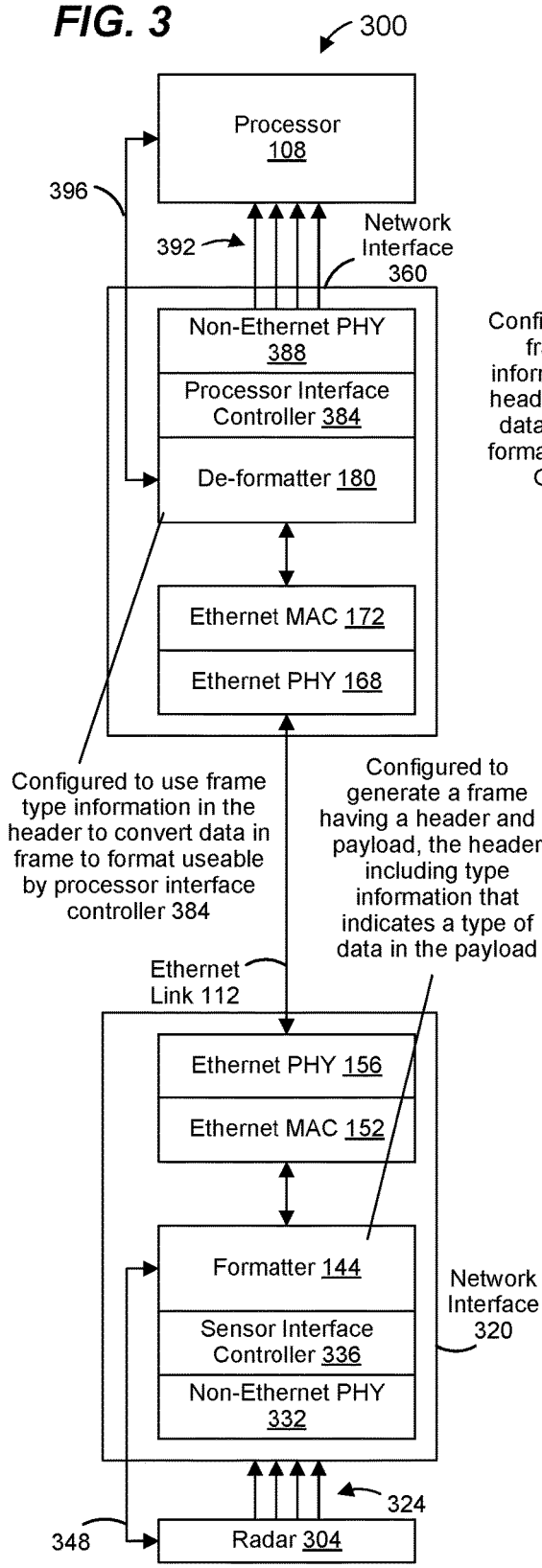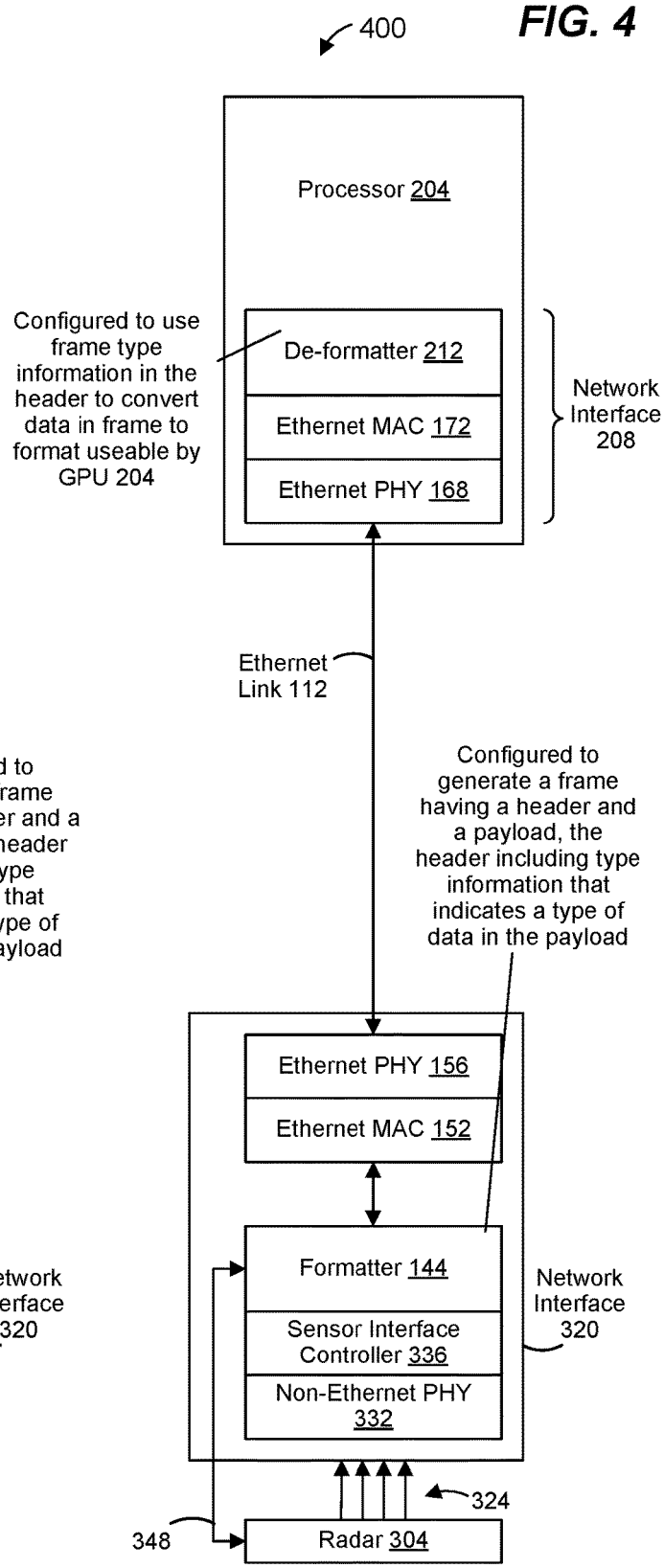

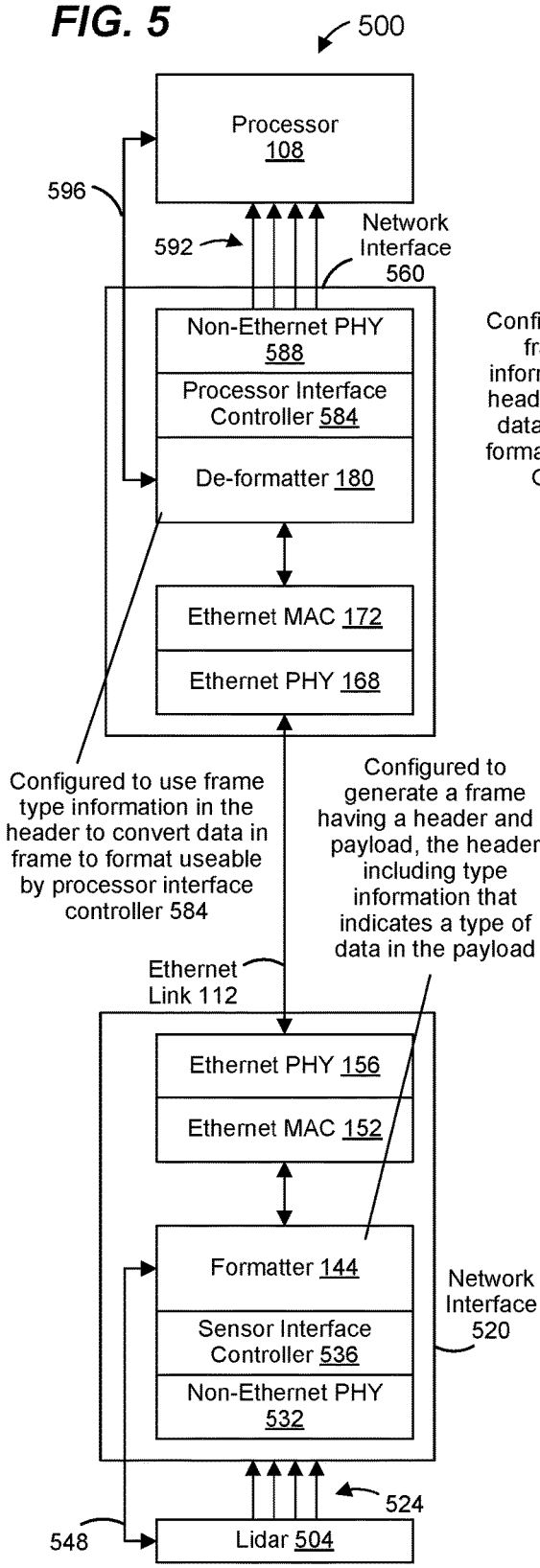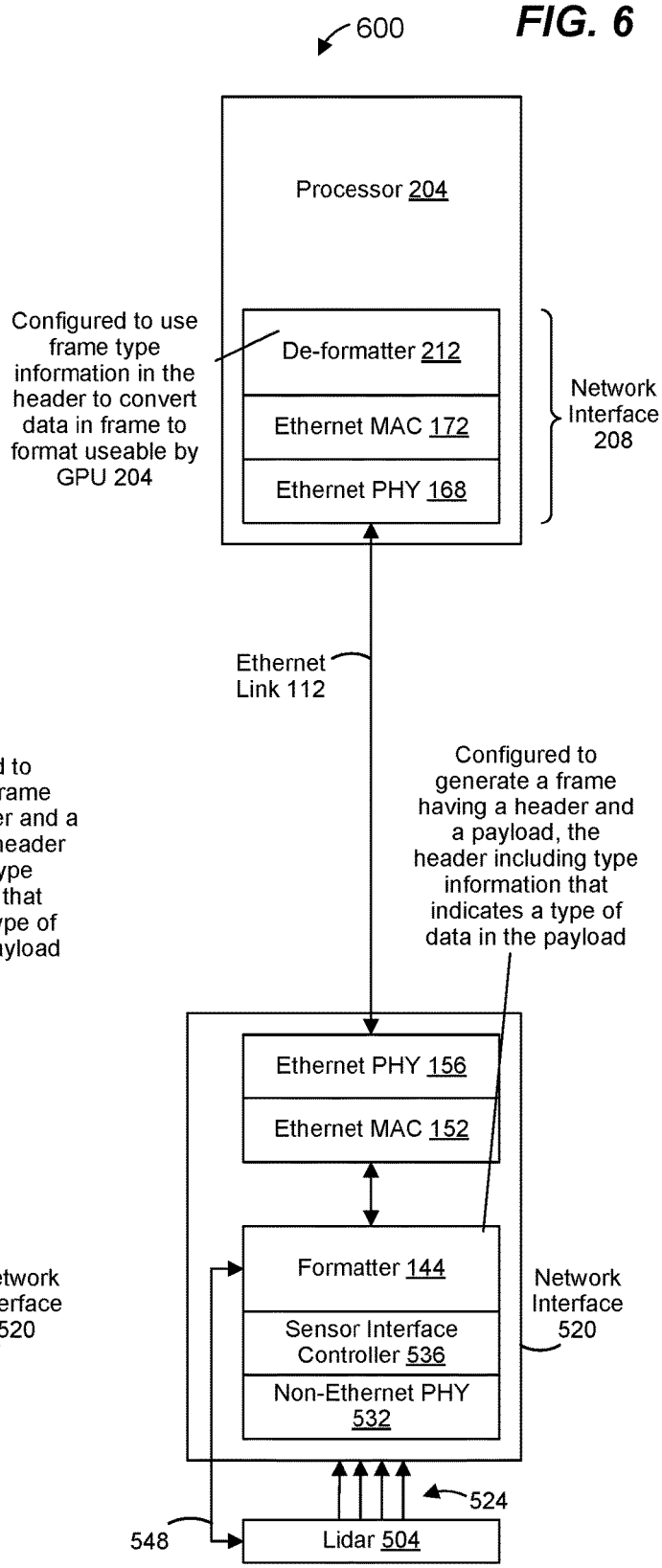

| Frame Type |
|---|
| Video: Frame Start |
| Video: Frame End |
| Video: Line Start |
| Video: Line End |
| Video: Blanking |
| Video: Video data (e.g., YUV, RGB, RAW, etc.) |
| Video: HDCP |
| Video: EDID |
| HDMI CEC |
| Audio |
| Lidar |
| Radar |
| OAM |
| Diagnostics |
| GPIO/ Remote register access |
| User-defined data |

912 — rows Frame Start through Video data
916 — rows Frame Start through EDID
Video 904 — rows Frame Start through EDID
Non-video 908 — rows HDMI CEC through User-defined data

| Frame Type |
|---|
| Video |
| HDMI CEC |
| Audio |
| Lidar |
| Radar |
| OAM |
| GPIO/ Diagnostics/Remote register access |
| User-defined data |

1004 — Video
Non-video 1008 — HDMI CEC through User-defined data

COMMUNICATION OF SENSOR DATA IN A MOTOR VEHICLE COMMUNICATION NETWORK

CROSS REFERENCES TO RELATED APPLICATIONS

The present application is a continuation application of U.S. application Ser. No. 17/500,838, filed on Oct. 13, 2021, entitled "Communication of Sensor Data in a Motor Vehicle Communication Network," which claims the benefit of U.S. Provisional Patent App. No. 63/091,282, entitled "Video Scrambler/Formatter Over Ethernet Network," filed on Oct. 13, 2020. Both of the applications referenced above are hereby expressly incorporated herein by reference in their entireties.

FIELD OF TECHNOLOGY

The present disclosure relates generally to electronic communications, and more particularly to communications in vehicle communication networks.

BACKGROUND

Motor vehicles (e.g., cars, buses, trucks, etc.) typically include numerous sensors, actuators, displays, computer processors, etc., interconnected by communication links. For instance, a motor vehicle may include one or more cameras, such as one or more rear-facing cameras, one or more side-facing cameras on each side of the vehicle, one or more front-facing cameras, etc. Video data generated by the camera(s) are provided to one or more electronic control units (ECUs) which may implement algorithms/functions associated with driver assistance technologies (e.g., backup assist, park assist, lane centering/keeping assistance, blind spot intervention, automatic braking for collision avoidance, etc.) and/or automated driving systems.

SUMMARY

In an embodiment, a method for communicating in a vehicular communication network includes: receiving, at a processor, data corresponding to a sensor, and generating, at the processor, a frame having a header and a payload. Generating the frame includes: selecting, based on the data corresponding to the sensor, a data type value from a set of multiple data type values corresponding to different respective types of data, the set of multiple data type values including at least i) a first data type value corresponding to video data from a camera, and ii) a second data type value corresponding to non-video data; generating the header to include one or more fields set to the selected data type value to indicate a type of data included in the payload; and generating the payload to include the data received from the sensor. The method also includes: providing, by the processor, the frame to an Ethernet network interface; encapsulating, at the Ethernet network interface, the frame in an Ethernet packet; and transmitting, by the Ethernet network interface, the Ethernet packet via an Ethernet link.

In another embodiment, a communication device comprises: a processor configured to: receive data corresponding to a sensor in a motor vehicle; and generate a frame having a header and a payload. Generating the frame includes: selecting, based on the data corresponding to the sensor, a data type value from a set of multiple data type values corresponding to different respective types of data, the set of multiple data type values including at least i) a first data type value corresponding to video data from a camera, and ii) a second data type value corresponding to non-video data, generating the header to include one or more fields set to the selected data type value to indicate a type of data included in the payload, and generating the payload to include the data received from the sensor. The communication devices also comprises an Ethernet network interface configured to: receive the frame from the processor, encapsulate the frame in an Ethernet packet, and transmit the Ethernet packet via an Ethernet link.

BRIEF DESCRIPTION OF THE DRAWINGS

FIG. 3 is a simplified block diagram of an example Radar communication system that utilizes the intermediate data frames having the format suitable for carrying various types of data from various types of sensors in a motor vehicle, according to another embodiment.

FIG. 4 is a simplified block diagram of another example Radar communication system that utilizes the intermediate data frames having the format suitable for carrying various types of data from various types of sensors in a motor vehicle, according to another embodiment.

FIG. 5 is a simplified block diagram of an example Lidar communication system that utilizes the intermediate data frames having the format suitable for carrying various types of data from various types of sensors in a motor vehicle, according to another embodiment.

FIG. 6 is a simplified block diagram of another example Lidar communication system that utilizes the intermediate data frames having the format suitable for carrying various types of data from various types of sensors in a motor vehicle, according to another embodiment.

FIG. 9 is a table illustrating an example set of values of a frame type field of the intermediate frame of FIG. 8, according to an embodiment.

FIG. 10 is a table illustrating another example set of values of a frame type field of the intermediate frame of FIG. 8, according to another embodiment.

DETAILED DESCRIPTION

In various embodiments described below, data in a motor vehicle communication system is included within data frames (sometimes referred to herein as "intermediate frames", which in turn are included within Ethernet packets for transmission via one or more Ethernet links in the motor vehicle communication system. In some embodiments, the intermediate frames have a format suitable for carrying various types of data from various types of sensors, such as video data from cameras, audio data from a microphone, light detection and ranging (Lidar) data from Lidar devices, radio detection and ranging (Radar) data from Radar devices, etc., via Ethernet links. For example, an intermediate frame includes an intermediate frame header and an intermediate frame payload, the intermediate frame header including data type information that indicates a type of data included in the intermediate frame payload, according to some embodiments. As another example, the intermediate frame header additionally or alternatively includes routing information, according to some embodiments. The routing information is used, for example, for populating one or more fields of a header of an Ethernet packet that encapsulates the intermediate frame, the one or more fields of the header of the Ethernet packet being used for routing the Ethernet packet via the motor vehicle communication network, according to some embodiments.

Use of intermediate frames, such as described above, in a motor vehicle communication network that communicates different types of data from different types of sensors helps to unify the processing of the different types of data and/or to use common electronics for processing the different types of data, and thus helps to reduce costs, at least in some embodiments.

Figure 1:
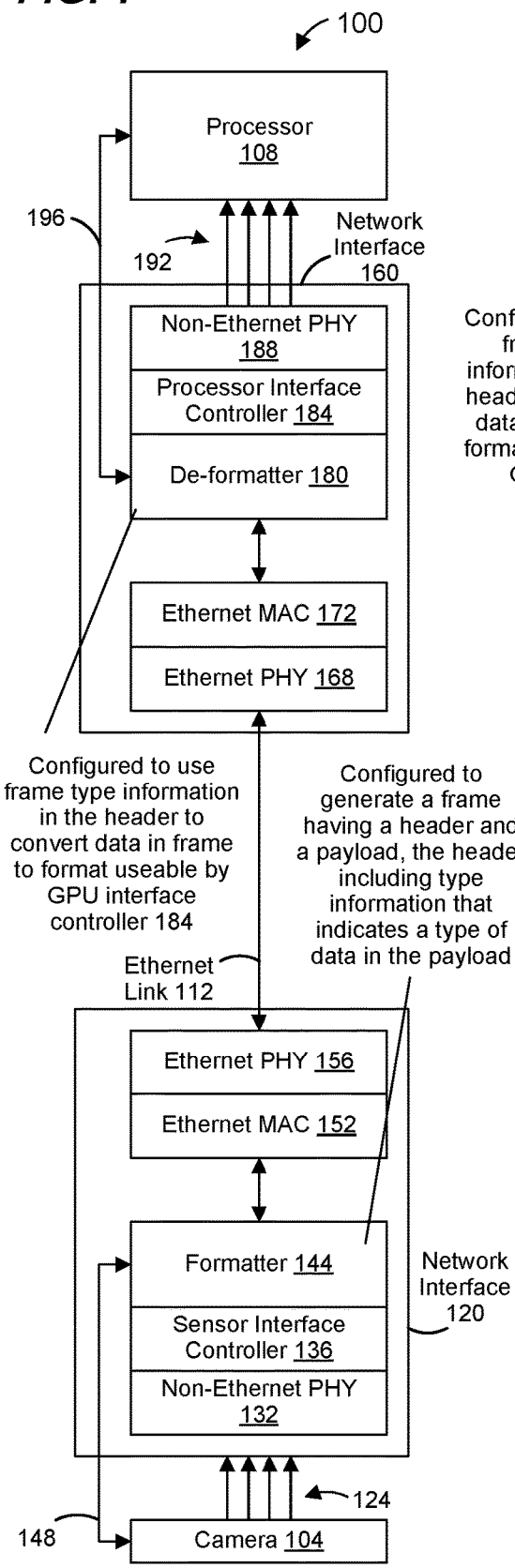
FIG. 1 is a simplified block diagram of an example video communication system that utilizes intermediate data frames encapsulated within Ethernet packets, the intermediate data frames having a format suitable for carrying various types of data from various types of sensors in a motor vehicle, according to an embodiment.

FIG. 1 is a simplified block diagram of an example video communication system 100 suitable for use in a motor vehicle, according to an embodiment. The system 100 includes a camera 104 that communicates with a processor 108 via an Ethernet communication link 112. The video communication system 100 utilizes intermediate frames form communicating data between the camera 104 and the processor 108. As is described further below, such intermediate frames can be used for communicating data from other types of sensors used in motor vehicles.

The camera 104 generates video data in a suitable video data format. In an embodiment, the camera 104 generates video data in format defined by a suitable Camera Serial Interface (CSI) protocol specification of the Mobile Industry Processor Interface (MIPI) Alliance, such as the CSI-2 protocol, an older version of the CSI protocol, or a future version of the CSI protocol. In another embodiment, the camera 104 generates video data in a format that conforms to a high-definition multimedia interface (HDMI), such as HDMI version 2.1, an older version of HDMI or a future version of HDMI. In other embodiments, the camera 104 generates video data in another suitable format different from format(s) described above, such as according to a Display Serial Interface (DSI) specification of the MIPI Alliance, a DisplayPort (DP) specification of the Video Electronics Standards Association (VESA), a Digital Video Interface (DVI) specification of the Digital Display Working Group (DDWG), a pixel bus, etc.

The processor 108 is configured to process video data in the video data format used by the camera 104, according to an embodiment. In other embodiments, the processor 108 is configured to process video data in a video data format different from the video data format used by the camera 104, and the processor 108 includes, or is coupled to, a converter (not shown) that converts the video data output by the camera 104 from the format used by the camera 104 to the format used by the processor 108.

In an embodiment, the processor 108 comprises a graphics processing unit (GPU). In other embodiments, the processor 108 comprises another suitable processor such as a general purpose processor, a digital signal processor (DSP), etc.

The Ethernet communication link 112 conforms to an automotive Ethernet protocol standard such as the IEEE 802.3ch Standard, the IEEE 802.3cy Standard (now under development), the IEEE 802.3cz Standard (now under development), etc.

A network interface device 120 is communicatively coupled to the camera 104 via a communication link 124. In an embodiment, the communication link 124 operates according to a suitable physical layer (PHY) protocol specification defined by the MIPI Alliance, such as C-PHY, D-PHY, etc. However, in other embodiments, the communication link 124 operates according to another suitable physical layer (PHY) protocol different from the PHY protocol specifications defined by the MIPI Alliance, such as PHY protocol compatible with HDMI, DSI, DP, DVI, a pixel bus, etc. For ease of explanation and brevity, the PHY protocol according to which the communication link 124 operates is referred to below as a "non-Ethernet PHY protocol."

The network interface device 120 includes a non-Ethernet PHY processor 132 (referred to herein as the "PHY processor 132") that is configured to perform PHY protocol functions corresponding to the non-Ethernet PHY protocol. For example, the PHY processor 132 is configured to receive data bursts via the communication link 124 and process the data bursts, where such data bursts conform to the non-Ethernet PHY protocol. In an embodiment, the PHY processor 132 processes serial data bursts received via the communication link 124 to generate parallel data.

The PHY processor 132 includes one or more receivers configured to receive signals via the communication link 124.

The network interface device 120 also includes a sensor interface controller 136 coupled to the PHY processor 132. The sensor interface controller 136 is configured to receive data from the PHY processor 132 and to format the received data. In an embodiment, the sensor interface controller 136 is configured to perform protocol functions corresponding to a layer above the non-Ethernet PHY protocol corresponding to the communication link 124.

The sensor interface controller 136 comprises a CSI controller that is configured to perform protocol functions corresponding to a CSI protocol defined by the MIPI Alliance, such as the CSI-2 protocol, which corresponds to a layer above the non-Ethernet PHY protocol in a communication protocol stack, according to an embodiment. In an embodiment in which the sensor interface controller 136 includes a CSI controller, the CSI controller is configured to receive data from the PHY processor 132 and to format the received data into packets having a format conforming to a CSI protocol defined by the MIPI Alliance, such as the CSI-2 protocol.

In other embodiments, the sensor interface controller 136 comprises another suitable interface controller, different from a CSI controller, that is configured to receive data consistent with another suitable PHY protocol (e.g., HDMI, DSI, DP, DVI, a pixel bus, etc.), and to format the received data into packets having another format (different than formats defined by CSI protocols) suitable for exchanging video data.

A formatter 144 is configured to receive data output by the sensor interface controller 136, and to generate, using the data received from the sensor interface controller 136, a data frame (sometimes referred to herein as an "intermediate frame") having a frame header (sometimes referred to herein as an "intermediate frame header") and a frame payload (sometimes referred to herein as an "intermediate frame payload").

In the example video communication system 100 of FIG. 1, the Ethernet communication link 112 communicates video data between the camera 104 and the GPU 108, and thus frames generated by the formatter 144 include video data in intermediate frame payloads of the intermediate frames. However, according to at least some embodiments, the format of intermediate frames generated by the formatter 144 are suitable for carrying non-video data as well, and thus the formatter 144 is configured for use in other communication systems (distinct from the video communication system 100) that communicate non-video data, as will be described further below. For example, the formatter 144 is configured for use in communication systems that transfer data from Radar devices, Lidar devices, microphones, temperature sensors, accelerometers, position sensors, velocity sensors, pressure sensors, flow-meters, gas sensors, etc.

To facilitate the use of the formatter 144 for communicating multiple types of data (e.g., video data and non-video data), the intermediate frame header generated by the formatter 144 includes one or more fields that indicate a type of data in the intermediate frame payload, the indicated type of data from among multiple different types of data, according to some embodiments.

To facilitate the use of the formatter 144 for communicating data via Ethernet links, the intermediate frame header generated by the formatter 144 additionally or alternatively includes one or more fields that include routing information for the intermediate frame (e.g., one or more of a source network identifier (ID), a destination network ID, priority information, virtual local area network (VLAN) information, etc.), according to some embodiments.

In the example video communication system 100 of FIG. 1, the formatter 144 includes in intermediate frame payloads video data that was received via the communication link 124. In some embodiments, the formatter 144 also receives non-video data from the camera 104, such as general purpose input/output (GPIO) data (e.g., indicating values of registers of the camera 104 (e.g., status registers, configuration registers, etc.)), diagnostic data, Operation and Management (OAM) data, data in a user-defined format different than a format used for video data, etc. In some embodiments, the formatter 144 includes such non-video data in intermediate frame payloads.

In some embodiments, the formatter 144 receives such non-video data via a communication link distinct from the communication link 124, such as a communication link 148.

An Ethernet media access control layer (MAC) processor 152 is communicatively coupled to the formatter 144. The Ethernet MAC processor 152 is also coupled to an Ethernet PHY processor 156. The Ethernet MAC processor 152 and the Ethernet PHY processor 156 may be considered components of an Ethernet network interface that is configured to i) receive intermediate frames from the formatter 144, ii) encapsulate the intermediate frames in Ethernet packets, and iii) transmit the Ethernet packets via the Ethernet link 112.

The Ethernet MAC processor 152 is configured perform MAC layer functions corresponding to an automotive Ethernet protocol standard such as the IEEE 802.3ch Standard, the IEEE 802.3cy Standard, the IEEE 802.3cz Standard, etc. For example, the Ethernet MAC processor 152 is configured to receive intermediate frames from the formatter 144 and to generate MAC data units (e.g., Ethernet frames) that encapsulate the intermediate frames.

In some embodiments, the Ethernet MAC processor 152 is configured to generate at least portions of an Ethernet header of an Ethernet frame that encapsulates an intermediate frame using routing information included in an intermediate frame header of the intermediate frame. As an illustrative example, the Ethernet MAC processor 152 is configured to generate a source address (SA) field and a destination address (DA) field of the Ethernet header using a source network ID and a destination network ID, respectively, in the intermediate frame header of the intermediate frame, according to an embodiment.

The Ethernet MAC processor 152 is coupled to an Ethernet PHY processor 156. The Ethernet PHY processor 156 is configured to receive Ethernet frames from the Ethernet MAC processor 152, and to convert information in the Ethernet frames to signals for transmission via the Ethernet link 112. The Ethernet PHY processor 152 includes one or more transmitters configured to transmit signals via the communication link 112.

A network interface device 160 is communicatively coupled to the network interface device 120 via the Ethernet link 112. The network interface device 160 is also communicatively coupled to the processor 108 via a communication link 192. In an embodiment, the communication link 192 operates according to the non-Ethernet PHY protocol by which the communication link 124 operates. For example, the communication link 192 operates according to a suitable PHY protocol specification defined by the MIPI Alliance, such as C-PHY, D-PHY, etc. However, in other embodiments, the communication link 192 operates according to another suitable PHY protocol different from the PHY protocol specifications defined by the MIPI Alliance, such as PHY protocol compatible with HDMI, DSI, DP, DVI, a pixel bus, etc. In some embodiments, the communication link 192 operates according to a non-Ethernet PHY protocol that is different than the non-Ethernet PHY protocol by which the communication link 124 operates.

The network interface device 160 includes an Ethernet PHY processor 168 and an Ethernet MAC processor 172. The Ethernet MAC processor 172 and the Ethernet PHY processor 168 may be considered components of an Ethernet network interface that is configured to i) receive Ethernet packets via the Ethernet link 112, ii) decapsulate intermediate frames from the Ethernet packets, and iii) output the intermediate frames.

The Ethernet PHY processor 168 is configured to receive signals (which were transmitted by the Ethernet PHY processor 156) via the Ethernet link 112, and to generate, based on the received signals, Ethernet frames. The Ethernet PHY processor 168 includes one or more receivers configured to receive signals via the communication link 112.

The Ethernet MAC processor 172 is communicatively coupled to the Ethernet PHY processor 168. The Ethernet MAC processor 172 is configured to perform MAC layer functions corresponding to the communication protocol according to which the Ethernet MAC processor 152 operates. For example, the Ethernet MAC processor 172 is configured to perform MAC layer functions corresponding to an automotive Ethernet protocol standard such as the IEEE 802.3ch Standard, the IEEE 802.3cy Standard, the IEEE 802.3cz Standard, etc.

The Ethernet MAC processor 172 is configured to receive Ethernet frames from the Ethernet PHY processor 168, and to decapsulate intermediate frames from the received Ethernet frames.

The Ethernet MAC processor 172 is communicatively coupled to a de-formatter 180. The de-formatter 180 is configured to receive intermediate frames output by the Ethernet MAC processor 172, and to use the one or more fields in the intermediate frame headers that indicate types of data included in intermediate frame payloads to convert data in the intermediate frame payloads to other format(s) usable by the network interface 160. For example, at least for intermediate frames that include video data, the de-formatter 180 is configured to generate, based on the intermediate frames received from the Ethernet MAC processor 172, data in a format corresponding to a format in which data is output by the sensor interface controller 136, according to an embodiment. For example, the de-formatter 180 is configured to generate, based on the intermediate frames received from the Ethernet MAC processor 172, packets having a format conforming to a CSI protocol defined by the MIPI Alliance, such as the CSI-2 protocol. In other embodiments, the de-formatter 180 is configured to generate, based on the intermediate frames received from the Ethernet MAC processor 172, packets that include data having another format (different than formats defined by CSI protocols) suitable for exchanging video data.

As another example, at least for frames that include non-video data from the camera 104, the de-formatter 180 is configured to generate, based on the intermediate frames received from the Ethernet MAC processor 172, data in a format usable by the processor 108, according to an embodiment.

The network interface device 160 also includes a processor interface controller 184 coupled to the de-formatter 180. The processor interface controller 184 is configured to perform protocol functions corresponding to the protocol according to which the sensor interface controller 136 operates. In an embodiment, the processor interface controller 184 comprises a CSI controller that is configured to perform protocol functions corresponding to a CSI protocol defined by the MIPI Alliance, such as the CSI-2 protocol. In an embodiment in which the processor interface controller 184 includes a CSI controller, the CSI controller is configured to receive from the de-formatter 180 packets having a format conforming to a CSI protocol defined by the MIPI Alliance, such as the CSI-2 protocol.

In other embodiments, the processor interface controller 184 comprises another suitable interface controller, different from a CSI controller, that is configured to receive packets having another format (different than formats defined by CSI protocols) suitable for exchanging video data.

In some embodiments in which the processor 108 is configured to process video data in a video data format different from the video data format used by the camera 104, and the processor interface controller 184 coverts the video data output by the camera 104 from the format used by the camera 104 to the format used by the processor 108.

The processor interface controller 184 is also coupled to a non-Ethernet PHY processor 188 (referred to herein as the "PHY processor 188") that is configured to perform PHY protocol functions corresponding to a non-Ethernet PHY protocol associated with a communication link 192. The PHY processor 188 is communicatively coupled to the processor 108 via the communication link 192. In an embodiment, the communication link 192 operates according to the non-Ethernet PHY protocol according to which the communication link 124 operates. For example, the communication link 192 operates according to a suitable PHY protocol specification defined by the MIPI Alliance, such as C-PHY, D-PHY, etc. In other embodiments, the communication link 192 operates according to another suitable PHY protocol different from the PHY protocol specifications defined by the MIPI Alliance, such as PHY protocol compatible with HDMI, DSI, DP, DVI, a pixel bus, etc. In other embodiments, the communication link 192 operates according to a suitable non-Ethernet PHY protocol that is different than the non-Ethernet PHY protocol according to which the communication link 124 operates.

The processor interface controller 184 is configured to receive packets from the de-formatter 180 and to provide the data from the received packets to the PHY processor 188 in a suitable format. The PHY processor 188 is configured to transmit data received from the processor interface controller 184 in data bursts via the communication link 192. In an embodiment, the PHY processor 188 receives data in parallel from the processor interface controller 184, and transmits serial data bursts via the communication link 192.

The PHY processor 188 includes one or more transmitters configured to transmit signals via the communication link 192.

In the example video communication system 100 of FIG. 1, the de-formatter 180 also receives intermediate frames that include non-video data from the camera 104, such as GPIO data (e.g., indicating values of registers of the camera 104 (e.g., status registers, configuration registers, etc.)), diagnostic data, OAM data, data in a user-defined format different than a format used for video data, etc. In some embodiments, the de-formatter 180 provides such non-video data to the processor 108 via a communication link distinct from the communication link 192, such as a communication link 196.

The formatter 144 is a processor that is configured to receive data corresponding to an output of a sensor (e.g., the camera 104, a microphone, a Lidar device, a Radar device, etc.), and to generate, using the data corresponding to output of the sensor, the intermediate frame having the intermediate frame header and the intermediate frame payload. In some embodiments, the processor is configured to perform one or more other operations of the formatter 144 described above.

According to an embodiment, the processor (formatter 144) comprises circuitry configured to receive data corresponding to an output of a sensor (e.g., the camera 104, a microphone, a Lidar device, a Radar device, etc.), and to generate, using the data corresponding to output of the sensor, the intermediate frame having the intermediate frame header and the intermediate frame payload. In various embodiments, the circuitry is configured to perform one or more other operations of the formatter 144 described above.

According to another embodiment, the processor (formatter 144) is configured to execute machine readable instructions stored in a memory; and the memory stores machine readable instructions that, when executed by the processor, cause the processor to receive data corresponding to an output of a sensor (e.g., the camera 104, a microphone, a Lidar device, a Radar device, etc.), and to generate, using the data corresponding to output of the sensor, the intermediate frame having the intermediate frame header and the intermediate frame payload. In various embodiments, the memory also stores machine readable instructions that, when executed by the processor, cause the processor to perform one or more other operations of the formatter 144 described above.

The de-formatter 180 is a processor that is configured to receive intermediate frames from an Ethernet network interface, and to use the one or more fields in the intermediate frame headers that indicate types of data included in intermediate frame payloads to convert data in the intermediate frame payloads to other format(s) usable by a network interface that is communicatively coupled to a processor (e.g., the processor 108). In various embodiments, the processor is also configured to perform one or more other operations of the de-formatter 180 described above.

According to an embodiment, the processor (de-formatter 180) comprises circuitry configured to use the one or more fields in the intermediate frame headers that indicate types of data included in intermediate frame payloads to convert data in the intermediate frame payloads to other format(s) usable by a network interface that is communicatively coupled to a processor (e.g., the processor 108). In various embodiments, the circuitry is also configured to perform one or more other operations of the de-formatter 180 described above.

According to another embodiment, the processor (de-formatter 180) is configured to execute machine readable instructions stored in a memory; and the memory stores machine readable instructions that, when executed by the processor, cause the processor to receive intermediate frames from an Ethernet network interface, and to use the one or more fields in the intermediate frame headers that indicate types of data included in intermediate frame payloads to convert data in the intermediate frame payloads to other format(s) usable by a network interface that is communicatively coupled to a processor (e.g., the processor 108). In various embodiments, the memory also stores machine readable instructions that, when executed by the processor, cause the processor to perform one or more other operations of the de-formatter 180 described above.

Figure 2:
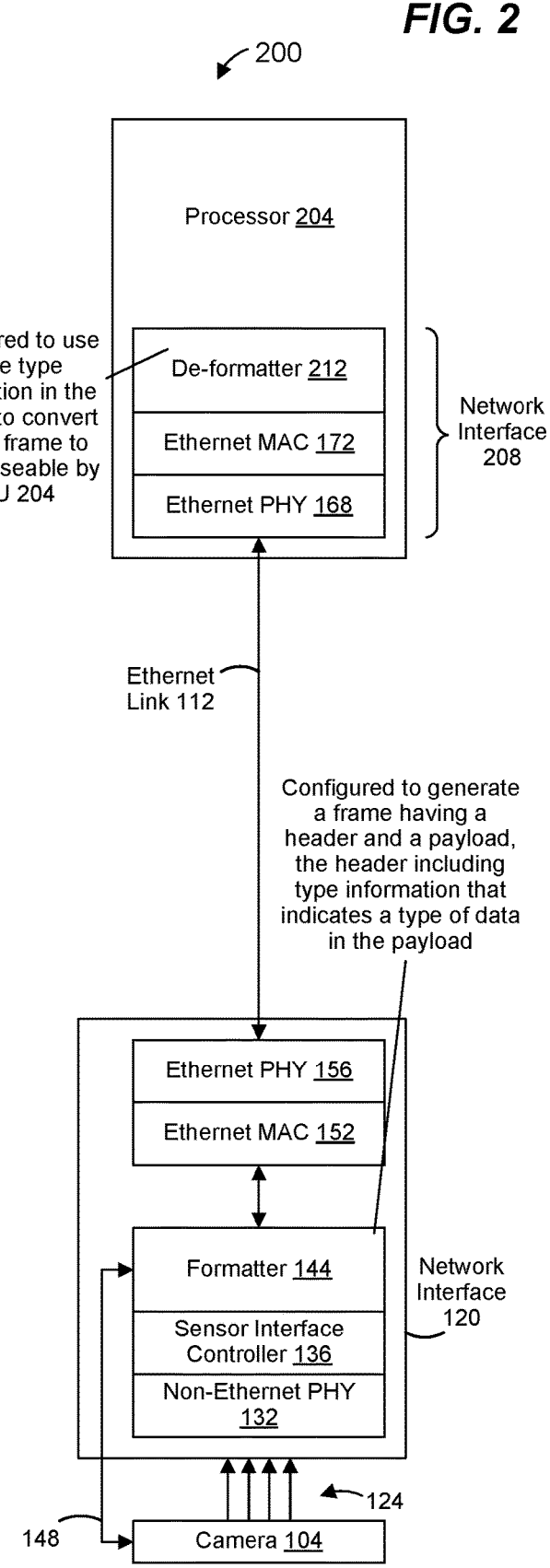
FIG. 2 is a simplified block diagram of another example video communication system that utilizes the intermediate data frames having the format suitable for carrying various types of data from various types of sensors in a motor vehicle, according to another embodiment.

FIG. 2 is a simplified block diagram of another example video communication system 200 suitable for use in a motor vehicle, according to another embodiment. The video communication system 200 is similar to the video communication system 100 of FIG. 1, and like-numbered elements are not described again in detail for purposes of brevity.

In the system 200, the processor 108 and the network interface 160 of the system 100 of FIG. 1 are replaced with a processor 204 with an integrated network interface 208. In an embodiment, the processor 204 comprises a GPU. In other embodiments, the processor 204 comprises another suitable processor such as a general purpose processor, a DSP, etc.

The network interface 208 includes a de-formatter 212. The de-formatter 212 is configured to receive intermediate frames output by the Ethernet MAC processor 172, and to use the one or more fields in the intermediate frame headers that indicate types of data included in intermediate frame payloads to convert data in the intermediate frame payloads to other format(s) usable by the processor 204. For example, at least for intermediate frames that include video data, the de-formatter 212 is configured to generate, based on the intermediate frames received from the Ethernet MAC processor 172, data in a format corresponding to a format in which data is output by the sensor interface controller 136, according to an embodiment. For example, the de-formatter 212 is configured to generate, based on the intermediate frames received from the Ethernet MAC processor 172, packets having a format conforming to a CSI protocol defined by the MIPI Alliance, such as the CSI-2 protocol. In other embodiments, the de-formatter 212 is configured to generate, based on the intermediate frames received from the Ethernet MAC processor 172, packets that include data having another format (different than formats defined by CSI protocols) suitable for exchanging video data.

As another example, at least for frames that include non-video data from the camera 104, the de-formatter 212 is configured to generate, based on the intermediate frames received from the Ethernet MAC processor 172, data in a format usable by the processor 204, according to an embodiment.

Referring to FIGS. 1 and 2, the formatter 144 generates, as discussed above, intermediate frame headers that include one or more fields having routing information, and the routing information according to some embodiments, and the Ethernet MAC processor 152 generates at least portions of an Ethernet header of an Ethernet frame using the routing information. In some embodiments, the network interface 120 and the network interface 160 of the system 100 are communicatively coupled via a Layer-2 switch (e.g., an Ethernet switch, not shown), and the Layer-2 switch uses routing information in the Ethernet header to route the Ethernet frame from the network interface 120 to the network interface 160. Similarly, in some embodiments, the network interface 120 and the processor 204 of the system 200 are communicatively coupled via a Layer-2 switch (e.g., an Ethernet switch, not shown), and the Layer-2 switch uses routing information in the Ethernet header to route the Ethernet frame from the network interface 120 to the processor 204.

The de-formatter 212 is a processor that is configured to receive intermediate frames from an Ethernet network interface, and to use the one or more fields in the intermediate frame headers that indicate types of data included in intermediate frame payloads to convert data in the intermediate frame payloads to other format(s) usable by a processor (e.g., the processor 204). In various other embodiments, the processor is also configured to perform one or more other operations of the de-formatter 212 described above.

According to an embodiment, the processor (de-formatter 212) comprises circuitry configured to receive intermediate frames from an Ethernet network interface, and to use the one or more fields in the intermediate frame headers that indicate types of data included in intermediate frame payloads to convert data in the intermediate frame payloads to other format(s) usable by a processor (e.g., the processor 204). In various other embodiments, the circuitry is also configured to perform one or more other operations of the de-formatter 212 described above.

According to another embodiment, the processor (de-formatter 212) is configured to execute machine readable instructions stored in a memory; and the memory stores machine readable instructions that, when executed by the processor, cause the processor to receive intermediate frames from an Ethernet network interface, and to use the one or more fields in the intermediate frame headers that indicate types of data included in intermediate frame payloads to convert data in the intermediate frame payloads to other format(s) usable by a processor (e.g., the processor 204). In various embodiments, the memory also stores machine readable instructions that, when executed by the processor, cause the processor to perform one or more other operations of the de-formatter 212 described above.

FIG. 3 is a simplified block diagram of an example Radar communication system 300 suitable for use in a motor vehicle, according to an embodiment. The Radar communication system 300 is structured similarly to the video communication system 100 of FIG. 1, and like-numbered elements are not described again in detail for purposes of brevity.

The system 300 includes a Radar device 304 ("Radar 304") that communicates with the processor 108 via the Ethernet communication link 112. The Radar 304 generates Radar data in a suitable data format.

A network interface device 320 is communicatively coupled to the Radar 304 via a communication link 324. The communication link 324 operates according to a non-Ethernet PHY protocol suitable for communicating Radar data.

The network interface device 320 includes a non-Ethernet PHY processor 332 (referred to herein as the "PHY processor 332") that is configured to perform PHY protocol functions corresponding to the non-Ethernet PHY protocol. For example, the PHY processor 332 is configured to receive data bursts via the communication link 324 and process the data bursts, where such data bursts conform to the non-Ethernet PHY protocol. In an embodiment, the PHY processor 332 processes serial data bursts received via the communication link 324 to generate parallel data.

The PHY processor 332 includes one or more receivers configured to receive signals via the communication link 324.

The network interface device 320 also includes a sensor interface controller 336 coupled to the PHY processor 332. The sensor interface controller 336 is configured to receive data from the PHY processor 332 and to format the received data in format suitable for communicating Radar data. In an embodiment, the sensor interface controller 336 is configured to perform protocol functions corresponding to a layer above the non-Ethernet PHY protocol corresponding to the communication link 324.

The formatter 144 is configured to receive data output by the sensor interface controller 336, and to generate, using the data received from the sensor interface controller 336, an intermediate frame such as described above. For example, one or more fields of the intermediate frame header that indicate a type of data in an intermediate frame payload are set to indicate that the intermediate frame payload includes Radar data.

The formatter 144 additionally or alternatively generates one or more fields of the intermediate frame header to include routing information for the intermediate frame (e.g., one or more of a source network ID, a destination network ID, priority information, VLAN information, etc.), according to some embodiments.

In the example Radar communication system 300 of FIG. 3, the formatter 144 includes in intermediate frame payloads Radar data that was received via the communication link 324. In some embodiments, the formatter 144 also receives non-Radar data from the Radar 304, such as GPIO data (e.g., indicating values of registers of the Radar 304 (e.g., status registers, configuration registers, etc.)), diagnostic data, OAM data, data in a user-defined format different than a format used for Radar data, etc. In some embodiments, the formatter 144 includes in intermediate frame payloads such non-Radar data.

In some embodiments, the formatter 144 receives such non-Radar data via a communication link distinct from the communication link 324, such as a communication link 348.

A network interface 360 is communicatively coupled to the processor 108. The network interface 360 includes the de-formatter 180, which is configured to receive intermediate frames output by the Ethernet MAC processor 172, and to use the one or more fields in the intermediate frame headers that indicate types of data included in intermediate frame payloads to convert data in the intermediate frame payloads to other format(s) usable by the network interface 360. For example, at least for intermediate frames that include Radar data, the de-formatter 180 is configured to generate, based on the intermediate frames received from the Ethernet MAC processor 172, data in a format corresponding to a format in which data is output by the sensor interface controller 336, according to an embodiment.

As another example, at least for frames that include non-Radar data from the Radar 304, the de-formatter 180 is configured to generate, based on the intermediate frames received from the Ethernet MAC processor 172, data in a format usable by the processor 108, according to an embodiment.

A processor interface controller 384 is coupled to the de-formatter 180. The processor interface controller 384 is configured to perform protocol functions corresponding to the protocol according to which the sensor interface controller 336 operates.

The processor interface controller 384 is also coupled to a non-Ethernet PHY processor 388 (referred to herein as the "PHY processor 388") that is configured to perform PHY protocol functions corresponding to the non-Ethernet PHY protocol. The PHY processor 388 is communicatively coupled to the processor 108 via a communication link 392. In an embodiment, the communication link 392 operates according to the non-Ethernet PHY protocol according to which the communication link 324 operates.

The processor interface controller 384 is configured to receive packets from the de-formatter 180 and to provide the data from the received packets to the PHY processor 388 in a suitable format. The PHY processor 388 is configured to transmit data received from the processor interface controller 384 in data bursts via the communication link 392. In an embodiment, the PHY processor 388 receives data in parallel from the processor interface controller 384, and transmits serial data bursts via the communication link 392.

The PHY processor 388 includes one or more transmitters configured to transmit signals via the communication link 392.

In the example Radar communication system 300 of FIG. 3, the de-formatter 180 also receives intermediate frames that include non-Radar data from the Radar 304, such as GPIO data (e.g., indicating values of registers of the Radar 304 (e.g., status registers, configuration registers, etc.)), diagnostic data, OAM data, data in a user-defined format different than a format used for Radar data, etc. In some embodiments, the de-formatter 180 provides such non-Radar data to the processor 108 via a communication link distinct from the communication link 392, such as a communication link 396.

FIG. 4 is a simplified block diagram of another example Radar communication system 400 suitable for use in a motor vehicle, according to another embodiment. The Radar communication system 400 is similar to the Radar communication system 300 of FIG. 3, and like-numbered elements are not described again in detail for purposes of brevity.

The de-formatter 212 is configured to receive intermediate frames output by the Ethernet MAC processor 172, and to use the one or more fields in the intermediate frame headers that indicate types of data included in intermediate frame payloads to convert data in the intermediate frame payloads to other format(s) usable by the processor 204. For example, at least for intermediate frames that include Radar data, the de-formatter 212 is configured to generate, based on the intermediate frames received from the Ethernet MAC processor 172, data in a format corresponding to a format in which data is output by the sensor interface controller 336, according to an embodiment.

As another example, at least for frames that include non-Radar data from the Radar 304, the de-formatter 212 is configured to generate, based on the intermediate frames received from the Ethernet MAC processor 172, data in a format usable by the processor 204, according to an embodiment.

Referring to FIGS. 3 and 4, the formatter 144 generates, as discussed above, intermediate frame headers that include one or more fields having routing information, and the routing information according to some embodiments, and the Ethernet MAC processor 152 generates at least portions of an Ethernet header of an Ethernet frame using the routing information. In some embodiments, the network interface 320 and the network interface 360 of the system 300 are communicatively coupled via a Layer-2 switch (e.g., an Ethernet switch, not shown), and the Layer-2 switch uses routing information in the Ethernet header to route the Ethernet frame from the network interface 320 to the network interface 360. Similarly, in some embodiments, the network interface 320 and the processor 204 of the system 400 are communicatively coupled via a Layer-2 switch (e.g., an Ethernet switch, not shown), and the Layer-2 switch uses routing information in the Ethernet header to route the Ethernet frame from the network interface 320 to the processor 204.

FIG. 5 is a simplified block diagram of an example Lidar communication system 500 suitable for use in a motor vehicle, according to an embodiment. The Lidar communication system 500 is structured similarly to the video communication system 100 of FIG. 1 and the Radar communication system 300 of FIG. 3, and like-numbered elements are not described again in detail for purposes of brevity.

The system 500 includes a Lidar device 504 ("Lidar 504") that communicates with the processor 108 via the Ethernet communication link 112. The Lidar 504 generates Lidar data in a suitable data format.

A network interface device 520 is communicatively coupled to the Lidar 504 via a communication link 524. The communication link 524 operates according to a non-Ethernet PHY protocol suitable for communicating Lidar data.

The network interface device 520 includes a non-Ethernet PHY processor 532 (referred to herein as the "PHY processor 532") that is configured to perform PHY protocol functions corresponding to the non-Ethernet PHY protocol. For example, the PHY processor 532 is configured to receive data bursts via the communication link 524 and process the data bursts, where such data bursts conform to the non-Ethernet PHY protocol. In an embodiment, the PHY processor 532 processes serial data bursts received via the communication link 524 to generate parallel data.

The PHY processor 532 includes one or more receivers configured to receive signals via the communication link 524.

The network interface device 520 also includes a sensor interface controller 536 coupled to the PHY processor 532. The sensor interface controller 536 is configured to receive data from the PHY processor 532 and to format the received data in format suitable for communicating Lidar data. In an embodiment, the sensor interface controller 536 is configured to perform protocol functions corresponding to a layer above the non-Ethernet PHY protocol corresponding to the communication link 524.

The formatter 144 is configured to receive data output by the sensor interface controller 536, and to generate, using the data received from the sensor interface controller 536, an intermediate frame such as described above. For example, one or more fields of the intermediate frame header that indicate a type of data in an intermediate frame payload are set to indicate that the intermediate frame payload includes Lidar data.

The formatter 144 additionally or alternatively generates one or more fields of the intermediate frame header to include routing information for the intermediate frame (e.g., one or more of a source network ID, a destination network ID, priority information, VLAN information, etc.), according to some embodiments.

In the example Lidar communication system 500 of FIG. 5, the formatter 144 includes in intermediate frame payloads Lidar data that was received via the communication link 524. In some embodiments, the formatter 144 also receives non-Lidar data from the Lidar 504, such as GPIO data (e.g., indicating values of registers of the Lidar 504 (e.g., status registers, configuration registers, etc.)), diagnostic data, OAM data, data in a user-defined format different than a format used for Lidar data, etc. In some embodiments, the formatter 144 includes in intermediate frame payloads such non-Lidar data.

In some embodiments, the formatter 144 receives such non-Lidar data via a communication link distinct from the communication link 524, such as a communication link 548.

A network interface 560 is communicatively coupled to the processor 108. The network interface 560 includes the de-formatter 180, which is configured to receive intermediate frames output by the Ethernet MAC processor 172, and to use the one or more fields in the intermediate frame headers that indicate types of data included in intermediate frame payloads to convert data in the intermediate frame payloads to other format(s) usable by the network interface 560. For example, at least for intermediate frames that include Lidar data, the de-formatter 180 is configured to generate, based on the intermediate frames received from the Ethernet MAC processor 172, data in a format corresponding to a format in which data is output by the sensor interface controller 536, according to an embodiment.

As another example, at least for frames that include non-Lidar data from the Lidar 504, the de-formatter 180 is configured to generate, based on the intermediate frames received from the Ethernet MAC processor 172, data in a format usable by the processor 108, according to an embodiment.

A processor interface controller 584 is coupled to the de-formatter 180. The processor interface controller 584 is configured to perform protocol functions corresponding to the protocol according to which the sensor interface controller 536 operates.

The processor interface controller 584 is also coupled to a non-Ethernet PHY processor 588 (referred to herein as the "PHY processor 588") that is configured to perform PHY protocol functions corresponding to the non-Ethernet PHY protocol. The PHY processor 588 is communicatively coupled to the processor 108 via a communication link 592. In an embodiment, the communication link 592 operates according to the non-Ethernet PHY protocol according to which the communication link 524 operates.

The processor interface controller 584 is configured to receive packets from the de-formatter 180 and to provide the data from the received packets to the PHY processor 588 in a suitable format. The PHY processor 588 is configured to transmit data received from the processor interface controller 584 in data bursts via the communication link 592. In an embodiment, the PHY processor 588 receives data in parallel from the processor interface controller 584, and transmits serial data bursts via the communication link 592.

The PHY processor 588 includes one or more transmitters configured to transmit signals via the communication link 592.

In the example Lidar communication system 500 of FIG. 5, the de-formatter 180 also receives intermediate frames that include non-Lidar data from the Lidar 504, such as GPIO data (e.g., indicating values of registers of the Lidar 504 (e.g., status registers, configuration registers, etc.)), diagnostic data, OAM data, data in a user-defined format different than a format used for Lidar data, etc. In some embodiments, the de-formatter 180 provides such non-Lidar data to the processor 108 via a communication link distinct from the communication link 592, such as a communication link 596.

FIG. 6 is a simplified block diagram of another example Lidar communication system 600 suitable for use in a motor vehicle, according to another embodiment. The Lidar communication system 600 is similar to the Lidar communication system 500 of FIG. 5, and like-numbered elements are not described again in detail for purposes of brevity.

The de-formatter 212 is configured to receive intermediate frames output by the Ethernet MAC processor 172, and to use the one or more fields in the intermediate frame headers that indicate types of data included in intermediate frame payloads to convert data in the intermediate frame payloads to other format(s) usable by the processor 204. For example, at least for intermediate frames that include Lidar data, the de-formatter 212 is configured to generate, based on the intermediate frames received from the Ethernet MAC processor 172, data in a format corresponding to a format in which data is output by the sensor interface controller 336, according to an embodiment.

As another example, at least for frames that include non-Lidar data from the Lidar 504, the de-formatter 212 is configured to generate, based on the intermediate frames received from the Ethernet MAC processor 172, data in a format usable by the processor 204, according to an embodiment.

Referring to FIGS. 5 and 6, the formatter 144 generates, as discussed above, intermediate frame headers that include one or more fields having routing information, and the routing information according to some embodiments, and the Ethernet MAC processor 152 generates at least portions of an Ethernet header of an Ethernet frame using the routing information. In some embodiments, the network interface 520 and the network interface 560 of the system 500 are communicatively coupled via a Layer-2 switch (e.g., an Ethernet switch, not shown), and the Layer-2 switch uses routing information in the Ethernet header to route the Ethernet frame from the network interface 520 to the network interface 560. Similarly, in some embodiments, the network interface 520 and the processor 204 of the system 600 are communicatively coupled via a Layer-2 switch (e.g., an Ethernet switch, not shown), and the Layer-2 switch uses routing information in the Ethernet header to route the Ethernet frame from the network interface 520 to the processor 204.

Figure 7:
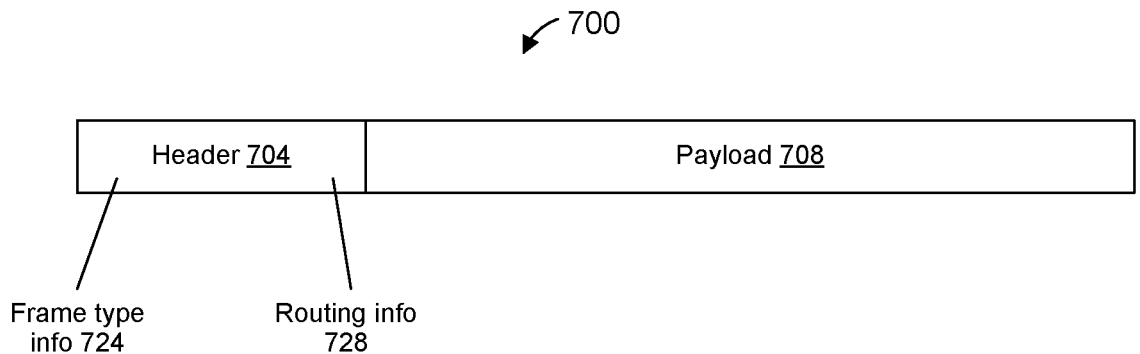
FIG. 7 is a diagram of an example intermediate frame format that is suitable for carrying various types of data from various types of sensors in a motor vehicle, according to an embodiment.

FIG. 7 is a diagram of an example intermediate frame 700 that a formatter, such as the formatter 144 of FIGS. 1-6, is configured to generate and the de-formatter 180/212 (FIGS. 1-6) is configured to process, according to an embodiment. The intermediate frame 700 has a format suitable for carrying various types of data from various types of sensors, such as video data from cameras, audio data from a microphone, Lidar data from Lidar devices, Radar data from Radar devices, etc., via Ethernet links.

The intermediate frame 700 includes an intermediate frame header 704 and an intermediate frame payload 708. The intermediate frame header 704 includes frame type information 724 that indicates a type of data included in the payload 708. The intermediate frame header 704 also includes routing information 728 that is useful for routing the intermediate frame (within an Ethernet frame) via an Ethernet network.

The frame type information 724 facilitates the use of the intermediate frame 700 for communicating multiple types of data (e.g., video data and non-video data). The frame type information 724 corresponds to one or more fields that indicate a type of data in the payload 708, the indicated type of data from among multiple different types of data, according to some embodiments.

The routing information 728 facilitates the use of the frame 700 for communicating data via Ethernet links and/or Ethernet switches, according to some embodiments. The routing information 728 corresponds to one or more fields that include routing information for the intermediate frame 700 (e.g., one or more of a source network ID, a destination network ID, priority information, VLAN information, etc.), according to some embodiments. In some embodiments, the routing information 728 is used, for example, for populating one or more fields of a header of an Ethernet packet that encapsulates the intermediate frame 700, the one or more fields of the header of the Ethernet packet being used for routing the Ethernet packet via a motor vehicle communication network, according to some embodiments.

In an embodiment, the intermediate frame 700 is generated by a formatter such as the formatter 144 discussed above with reference to FIGS. 1-6. For example, the formatter 144 receives data from a sensor, encapsulates the data in the payload 708, and sets the frame type information 724 to indicate a type of the data in the payload 708. Upon receiving the intermediate frame 700, a de-formatter, such as the de-formatter 180/212 discussed above with reference to FIGS. 1-6, uses the frame type information 724 to re-format the data in the payload 708 into an appropriate format for communication to and/or use by a processor, such as the processor 108/204 (FIGS. 1-6), according to some embodiments.

In some embodiments, an Ethernet network interface is configured to generate (e.g., the Ethernet MAC processor 152 is configured to generate) at least portions of an Ethernet header of an Ethernet frame that encapsulates an intermediate frame 700 using the routing information 728. As an illustrative example, the Ethernet network interface generates (e.g., the Ethernet MAC processor 152 generates) an SA field and a DA field of the Ethernet header using the routing information 728, according to an embodiment. As another illustrative example, the Ethernet network interface generates (e.g., the Ethernet MAC processor 152 generates) an IEEE 802.1Q tag field of the Ethernet header using the routing information 728, according to an embodiment. In some embodiments, one or more Ethernet switches in a motor vehicle communication network use information in the Ethernet header (e.g., one of, or any suitable combination of two or more of, the SA field, the DA field, the 802.1Q tag field, etc.) to route the Ethernet frame to an intended end point, e.g., a processor such as the processor 108/204.

Figure 8:
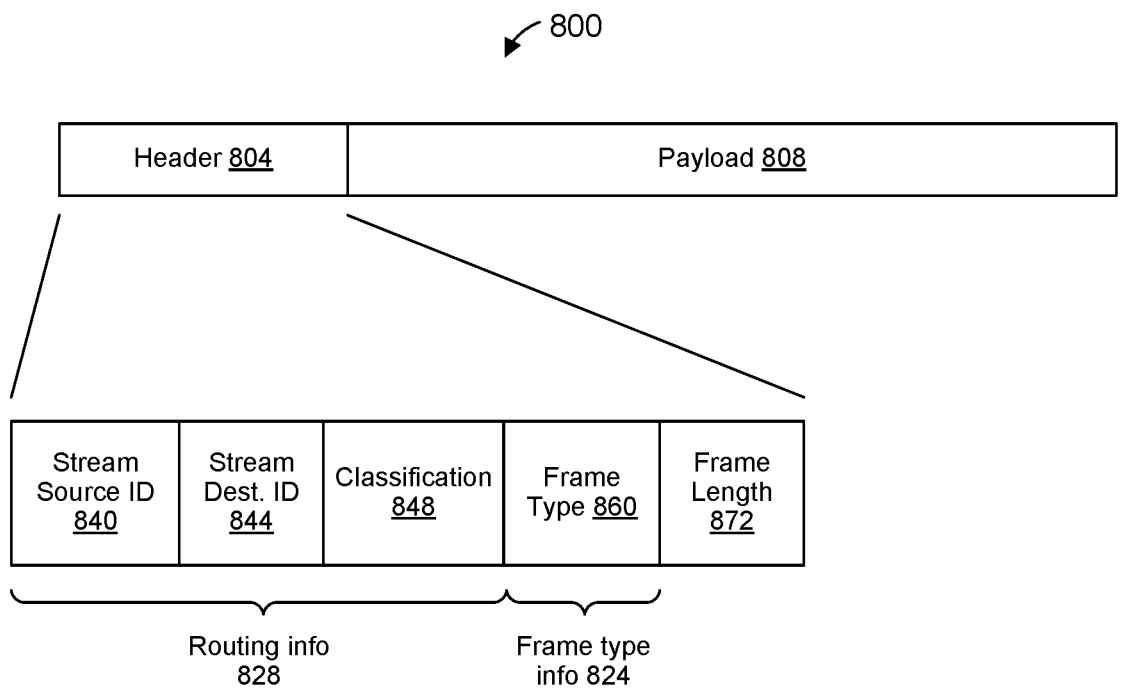
FIG. 8 is a diagram of another example intermediate frame format that is suitable for carrying various types of data from various types of sensors in a motor vehicle, according to another embodiment.

FIG. 8 is a diagram of another example intermediate frame 800 that a formatter, such as the formatter 144 of FIGS. 1-6, is configured to generate and the de-formatter 180/212 (FIGS. 1-6) is configured to process, according to an embodiment. The intermediate frame 800 is an example implementation of the intermediate frame 700 of FIG. 7, according to an embodiment. The intermediate frame 800 has a format suitable for carrying various types of data from various types of sensors, such as video data from cameras, audio data from a microphone, Lidar data from Lidar devices, Radar data from Radar devices, etc., via Ethernet links.

The intermediate frame 800 includes an intermediate frame header 804 and an intermediate frame payload 808. The intermediate frame header 804 includes frame type information 824 that indicates a type of data included in the payload 808. The intermediate frame header 804 also includes routing information 828 that is useful for routing the intermediate frame (within an Ethernet frame) via an Ethernet network.

The routing information 828 corresponds to a stream source ID field 840, a stream destination ID field 844, and a classification field 848. In an embodiment, the classification field 848 includes priority information. In another embodiment, the classification field 848 additionally or alternatively includes VLAN information. For example, in one embodiment, the classification field 848 includes a first subfield that includes priority information and a second subfield that includes VLAN information.

In an embodiment, in connection with receiving the intermediate frame 800, an Ethernet network interface generates (e.g., the Ethernet MAC processor 152 generates) an SA field and a DA field of the Ethernet header using information in the stream source ID field 840, a stream destination ID field 844, respectively. In another embodiment, the Ethernet network interface additionally or alternatively generates (e.g., the Ethernet MAC processor 152 generates) an 802.1Q tag field of the Ethernet header using information in the classification field 848. For example, the Ethernet network interface generates (e.g., the Ethernet MAC processor 152 generates) generates a priority code point (PCP) subfield and a VLAN identifier (VID) subfield of the 802.1Q tag field of the Ethernet header using the first subfield that includes priority information and the second subfield that includes VLAN information, respectively, of the classification field 848.

In an embodiment, the frame type information 824 corresponds to a frame type field 860, where different values of the frame type field 860 indicate respective different types of data included in the payload 808. In another embodiment, the frame type information 824 also corresponds to a frame subtype field (not shown). In such embodiments, different values of the frame type field 860 indicate respective different types of data included in the payload 808, and different values of the frame subtype field indicate respective different subtypes of data (within the type of data indicated by the frame type field 860) included in the payload 808.

FIG. 9 is a table illustrating an example set of values 900 of the frame type field 860 (FIG. 8), according to an embodiment. Each row of the table 900 corresponds to a respective different type of data included in the payload 808, and each row of the table 900 corresponds to a respective different value of the frame type field 860, according to an embodiment.

The set of values 900 includes a first subset of values 904 that correspond to video-type data, and a second subset of values 908 that correspond to non-video-type data. In some embodiments, the first subset of values 904 includes one or more values 912 that are each relevant for video data in any of multiple different formats. In some embodiments, the first subset of values additionally or alternative includes one or more values 916 corresponding to respective different types of video data to standards other than CSI, such as HDCP, EDID, etc.

The values 912 includes a value indicating that the payload 808 includes data corresponding to a frame start; a value indicating that the payload 808 includes data corresponding to a frame end; a value indicating that the payload 808 includes data corresponding to a line start; a value indicating that the payload 808 includes data corresponding to a line end; a value indicating that the payload 808 includes data corresponding to a blanking interval; and a value indicating that the payload 808 includes data corresponding to pixel values (e.g., YUV data, RGB data, raw data, etc.).

The values 916 includes a value indicating that the payload 808 includes HDCP data; a value indicating that the payload 808 includes EDID data; etc.

The subset of values 908 includes a value indicating that the payload 808 includes HDMI CEC data; a value indicating that the payload 808 includes audio data; a value indicating that the payload 808 includes Lidar data; a value indicating that the payload 808 includes Radar data; a value indicating that the payload 808 includes OAM data; a value indicating that the payload 808 includes diagnostics data; a value indicating that the payload 808 includes GPIO and/or remote register access data; and a value indicating that the payload 808 includes data in a user-defined format.

In various other embodiments, one or more of the values in the set of values 900 is omitted, and/or one or more other values corresponding to other types of data are included among the set of values 900.

Referring to FIGS. 7 and 9, in some embodiments in which the header 704 includes a frame type field, each row of the table 900 corresponds to a respective different value of the frame type field, according to an embodiment.

FIG. 10 is a table illustrating another example set of values 1000 of the frame type field 860 (FIG. 8), according to another embodiment. The set of values 1000 is used when the header 804 also includes a sub-type field as part of the frame type information 824. Each row of the table 1000 corresponds to a respective different type of data included in the payload 808, and each row of the table 1000 corresponds to a respective different value of the frame type field 860, according to an embodiment.

The set of values 1000 includes a first value 1004 that corresponds to video-type data; and a subset of values 1008 that correspond to non-video-type data.

When the frame type field 860 is set to a particular value illustrated in FIG. 10, the sub-type field of the header 804 is set to a value to indicate a particular sub-type of data included in the payload 808, at least for some values of the frame type field 860. For example, when the frame type field 860 is set to the first value 1004, different values of the sub-type field indicate different respective sub-types of video data. In an embodiment, when the frame type field 860 is set to the first value 1004, different values of the sub-type field correspond to different types of video data in the third subset of values 912 and/or the fourth subset of values 916 of FIG. 9.

When the frame type field 860 is set to a value corresponding to GPIO/Diagnostics/Remote register access, different values of the sub-type field indicate whether the data in the payload corresponds to GPIO data, diagnostics data, or remote register access data, according to an embodiment.

In various other embodiments, one or more of the values in the set of values 1000 is omitted, and/or one or more other values corresponding to other types of data are included among the set of values 1000. As an illustrative example, the subset of values 1008 includes one or more other types of non-video data and/or one or more of the values illustrated in FIG. 10 are omitted, according to various embodiments. In some embodiments, one or more of the types of data indicated in FIG. 10 in the set of values 1000 are grouped into a single value of the frame type field 860, and the sub-type field is set to distinguish between different sub-types of data.

Referring to FIGS. 7 and 10, in some embodiments in which the header 704 includes a frame type field and a frame sub-type field, each row of the table 1000 corresponds to a respective different value of the frame type field, according to an embodiment.

Figure 11:
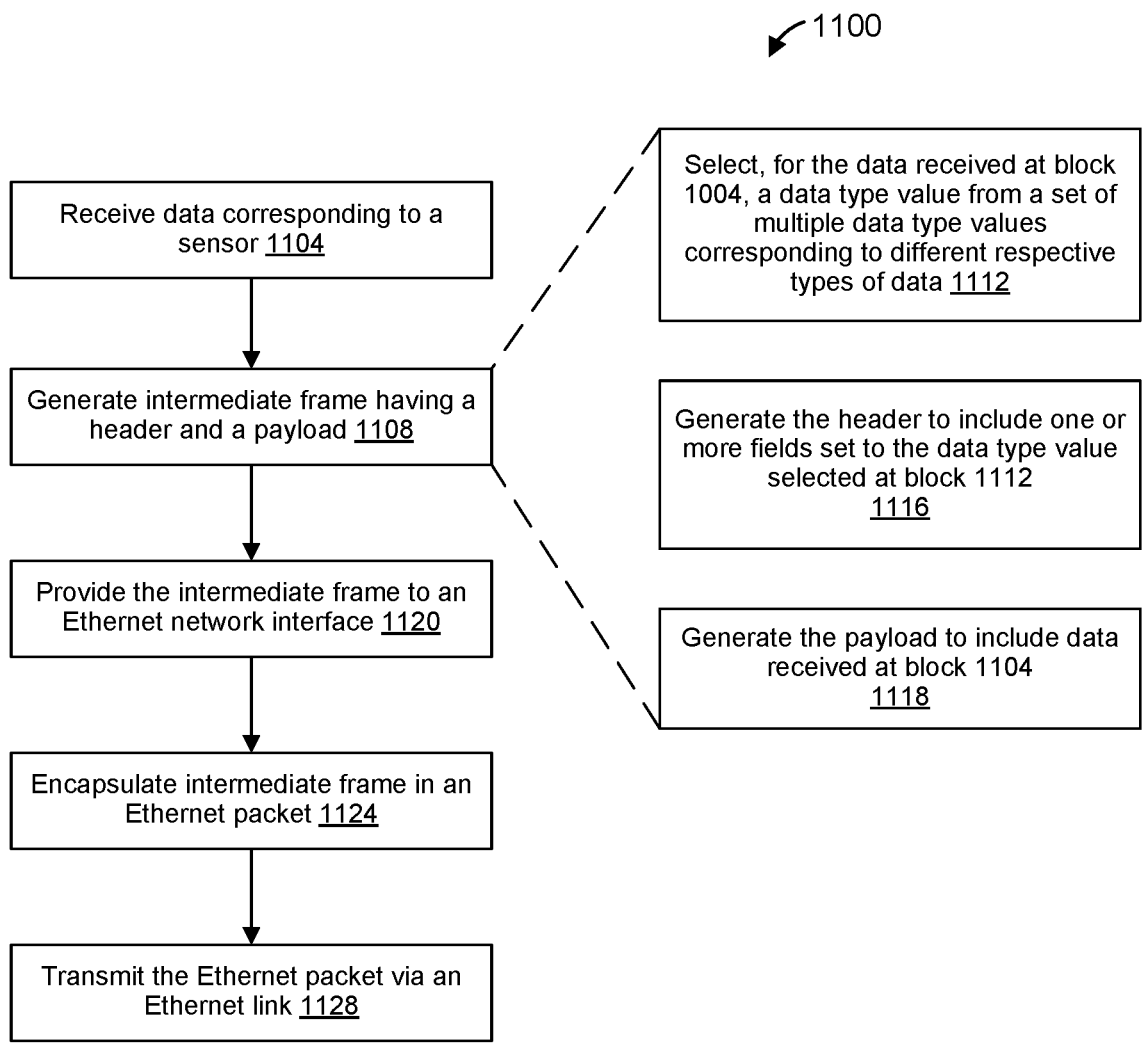
FIG. 11 is a flow diagram of an example method for communicating in a motor vehicle communication network using intermediate data frames having the format suitable for carrying various types of data from various types of sensors in a motor vehicle, according to an embodiment.

FIG. 11 is a flow diagram of an example method 1100 for communicating in a motor vehicle communication network, according to an embodiment. The method 1100 is implemented by a network interface such as the network interface 120/320/520 of FIGS. 1-6, according to various embodiments. The method 1100 is implemented in another suitable network interface in other embodiments.

At block 1104, a processor (e.g., the formatter 144) receives data corresponding to a sensor. In an embodiment, the sensor is included in a motor vehicle. In at least some instances, the data received at block 1104 is sensing data output by the sensor (e.g., video data output by a camera; audio data output by a microphone; Lidar data output by a Lidar device; Radar data output by a Radar device; etc.). In other instances, the data received at block 1104 comprises diagnostics data, OAM data, GPIO data, values of registers of the sensor (e.g., status registers, configuration registers, etc.), data in a user-defined format different than a format used for the sensing data, etc. In an embodiment, receiving data at block 1104 includes receiving data from a sensor interface controller such as the sensor interface controller 136/336/536 of FIGS. 1-6. In some instances, receiving data at block 1104 includes receiving data from a communication link such as the communication link 148/348/548 of FIGS. 1-6.

At block 1108, the processor generates an intermediate frame having an intermediate frame header and an intermediate frame payload. Generating the intermediate frame at block 1108 includes the processor selecting, at block 1112, a data type value for the data received at block 1104 from a set of multiple data type values corresponding to different respective types of data. In an embodiment, the set of multiple data types includes at least i) a first data type corresponding to video data from a camera, and ii) a second data type value corresponding non-video data.

In some embodiments and/or implementations, the data received at block 1104 includes data type information that indicates a data type of the data received at block 1104, and the processor uses the data type information in the data received at block 1104 to select the data type value at block 1112. For example, CSI packets include a Data ID field that includes data type information that indicates a data type included in the CSI packet. In some embodiments and/or implementations in which receiving data at block 1104 includes receiving a CSI packet, the processor uses the data type information in the Data ID field of the CSI packet to select the data type value at block 1112.

As an illustrative example, if the Data ID field of the CSI packet indicates the data includes a frame start, the processor selects the data type value at block 1112 to indicate video-type data and optionally to indicate a frame start. As another illustrative example, if the Data ID field of the CSI packet indicates the data includes a frame end, the processor selects the data type value at block 1112 to indicate video-type data and optionally to indicate a frame end. As another illustrative example, if the Data ID field of the CSI packet indicates the data includes a line start, the processor selects the data type value at block 1112 to indicate video-type data and optionally to indicate a line start. As another illustrative example, if the Data ID field of the CSI packet indicates the data includes a line end, the processor selects the data type value at block 1112 to indicate video-type data and optionally to indicate a line end. As another illustrative example, if the Data ID field of the CSI packet indicates the data includes blanking interval information, the processor selects the data type value at block 1112 to indicate video-type data and optionally to indicate blanking interval data. As another illustrative example, if the Data ID field of the CSI packet indicates the data includes YUV data, the processor selects the data type value at block 1112 to indicate video-type data and optionally to indicate YUV data. As another illustrative example, if the Data ID field of the CSI packet indicates the data includes RGB data, the processor selects the data type value at block 1112 to indicate video-type data and optionally to indicate RGB data. As another illustrative example, if the Data ID field of the CSI packet indicates the data includes raw video data, the processor selects the data type value at block 1112 to indicate video-type data and optionally to indicate raw data.

In some embodiments, the data received at block 1104 may be received via one of multiple different communication links with the sensor (e.g., the links 124 and 148 of FIGS. 1-2; the links 324 and 348 of FIGS. 3-4; and the links 524 and 548 of FIGS. 5-6), and the different communication links correspond to respective different types of data. Thus, in some embodiments in which the data received at block 1104 may be received via one of multiple different communication links with the sensor, the processor determines via which communication link the data was received, and selects the data type value at block 1112 based on the determined communication link via which the data was received.

In some embodiments, the processor is preconfigured to select, at block 1112, a particular data type value or to select from a particular subset of data type values that correspond to a sensor to which the processor is communicatively coupled (when the processor is not communicatively coupled to any other types of sensors). For example, if the processor is communicatively coupled to a microphone (and not to any other types of sensors), the processor is preconfigured to select, at block 1112, a data type value corresponding to audio data, or to select from a particular subset of data type values that are relevant to microphones.

In some embodiments, selecting the data type value at block 1112 comprises selecting the data type value from a set of multiple data type values that includes at least i) a first data type value corresponding to video data from a camera, and ii) a second data type value corresponding to non-video data. In some embodiments, selecting the data type value at block 1112 comprises selecting the data type value from a set of multiple data type values that includes at least i) a first data type value corresponding to video data from a camera, and one of, or any suitable combination of two or more of: ii) a second data type value corresponding to Lidar data from a Lidar device, iii) a third data type value corresponding to Radar data from a Radar device, iv) a fourth data type value corresponding to audio data from a microphone, v) a fifth data type value corresponding to diagnostics data corresponding to the sensor, vi) a sixth data type value corresponding to OAM data corresponding to the sensor, vii) a seventh data type value corresponding to GPIO data corresponding to the sensor, viii) an eighth data type value corresponding to values of internal registers of the sensor, ix) a ninth data type value corresponding to data in a user-defined format, etc.

Generating the intermediate frame at block 1108 also includes the processor generating, at block 1116, the intermediate frame header to include one or more fields set to the data type value selected at block 1112 to indicate a type of data included in the intermediate frame payload.

Generating the intermediate frame at block 1108 also includes the processor generating, at block 1118, the intermediate frame payload to include at least some of the data received at block 1104.

At block 1120, the intermediate frame generated at block 1108 is provided to an Ethernet network interface. In an embodiment, the processor provides the intermediate frame to the Ethernet network interface. In an embodiment, the formatter 144 provides the intermediate frame to the Ethernet MAC processor 152.

At block 1124, the Ethernet network interface encapsulates the intermediate frame in an Ethernet packet. In an embodiment, the Ethernet MAC processor 152 encapsulates the intermediate frame in an Ethernet packet frame; and the Ethernet MAC processor 152 provides the Ethernet frame to the Ethernet PHY processor 156, which generates an Ethernet packet.

At block 1128, the Ethernet network interface transmits the Ethernet packet via an Ethernet communication link. In an embodiment, the Ethernet PHY processor 156 transmits the Ethernet packet via an Ethernet link such as the Ethernet link 112.

In some embodiments, the method 1100 further includes generating the intermediate frame header to include routing information. In some embodiments, generating the intermediate frame header to include routing information comprises generating the intermediate frame header to include a source identifier and a destination identifier. In some embodiments, the method 1100 further comprises: determining, at the processor, the source identifier using information included within the data corresponding to the sensor; and determining, at the processor, the destination identifier using information included within the data corresponding to the sensor.

In some embodiments, generating the header to include routing information comprises generating the header to include one or both of i) priority information, and ii) VLAN information. In some embodiments, the method 1100 further comprises: generating, by the Ethernet network interface, an IEEE 802.1Q tag for the Ethernet packet using the one or both of i) priority information, and ii) VLAN information in the header of the frame.

In some embodiments and/or implementations, the data received at block 1104 includes flow identifier information that indicates a data flow, among multiple data flows, to which the data received at block 1104 belongs, and the processor uses the flow identifier information in the data received at block 1104 to select some of the routing information. For example, CSI packets include a virtual channel field that includes flow identification information that indicates a data flow, among multiple data flows, to which data within the CSI packet belongs. In some embodiments and/or implementations in which receiving data at block 1104 includes receiving a CSI packet, the processor uses the flow identifier information in the virtual channel field of the CSI packet to select routing information to be included in the intermediate frame header. In some embodiments and/or implementations in which receiving data at block 1104 includes receiving a CSI packet, the processor uses the flow identifier information in the virtual channel field of the CSI packet to select a VLAN information to be included in the intermediate frame header.

Figure 12:
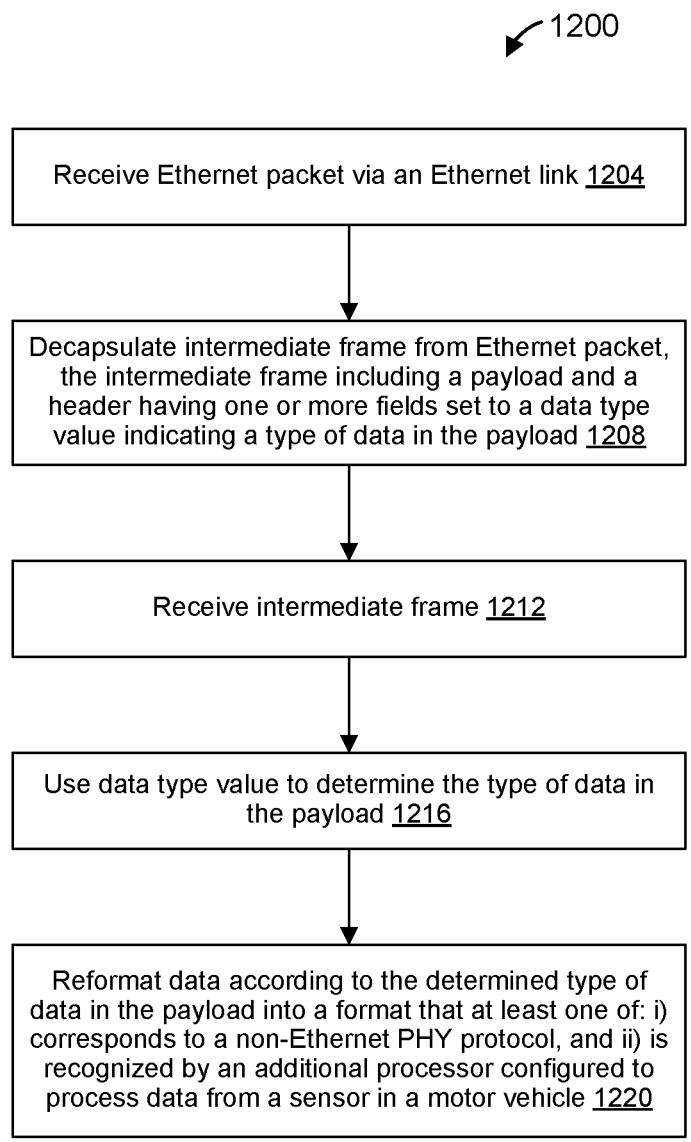
FIG. 12 is a flow diagram of another example method for communicating in a motor vehicle communication network using intermediate data frames having the format suitable for carrying various types of data from various types of sensors in a motor vehicle, according to another embodiment.

FIG. 12 is a flow diagram of another example method 1200 for communicating in a motor vehicle communication network, according to another embodiment. The method 1200 is implemented by a network interface such as the network interface 160/208/360/560 of FIGS. 1-6, according to various embodiments. The method 1200 is implemented in another suitable network interface in other embodiments.

At block 1204, an Ethernet network interface receives an Ethernet packet via an Ethernet communication link. In an embodiment, the Ethernet PHY processor 168 receives the Ethernet packet via an Ethernet link such as the Ethernet link 112.

At block 1208, the Ethernet network interface decapsulates an intermediate frame from the Ethernet packet. For example, the Ethernet MAC processor 172 decapsulates the intermediate frame from an Ethernet packet, according to an embodiment. In an embodiment, the intermediate frame includes an intermediate frame header and an intermediate frame payload, the intermediate frame header having one or more fields that are set to a data type value that indicates a type of data included in the intermediate frame payload.

At block 1212, a processor receives the intermediate frame from the Ethernet network interface. For example, the de-formatter 180/122 receives the intermediate frame from the Ethernet MAC processor 172.

In an embodiment, the intermediate frame received at block 1212 includes data from a sensor in a motor vehicle. In at least some instances, the data received at block 1212 is sensing data output by the sensor (e.g., video data output by a camera; audio data output by a microphone; Lidar data output by a Lidar device; Radar data output by a Radar device; etc.). In other instances, the data received at block 1212 comprises diagnostics data, OAM data, GPIO data, values of registers of the sensor (e.g., status registers, configuration registers, etc.), data in a user-defined format different than a format used for the sensing data, etc.

At block 1216, the processor uses the data type value in the one or more fields of the intermediate frame header to determine the type of data included in the intermediate frame payload. In an embodiment, determining the type of data at block 1216 includes selecting the type of data from a set of multiple data types corresponding to different respective possible values of the one or more fields of the intermediate frame header, the set of multiple data types including at least i) video-type data from a camera that corresponds to a first possible data type value of the one or more fields of the intermediate frame header, and ii) non-video-type data that corresponds to a second possible data type value of the one or more fields of the intermediate frame header. In an embodiment, the de-formatter 180/122 uses the data type value in the one or more fields of the intermediate frame header to determine the type of data included in the intermediate frame payload.

At block 1220, the processor reformats data in the intermediate frame payload according to the type of data (determined at block 1216) included in the payload into a format that at least one of: i) corresponds to a non-Ethernet PHY protocol, and ii) is recognized by an additional processor configured to process data from a sensor in a motor vehicle. For example, the de-formatter 180/122 reformats data in the intermediate frame payload into a format that at least one of: i) corresponds to a non-Ethernet PHY protocol associated with the communication link 192/392/592, and ii) is recognized by the processor 108/204.

In some embodiments and/or implementations, the data format that i) corresponds to a non-Ethernet PHY protocol, and/or ii) is recognized by an additional processor corresponds to a packet format that includes one or more packet fields that can be set to indicate a data type of data included in the packet; and reformatting the data at block 1220 includes setting the one or more packet fields to a data type value corresponding to the type of data determined at block 1216. For example, CSI packets include a Data ID field that includes data type information that indicates a data type included in the CSI packet. In some embodiments and/or implementations in which block 1220 includes reformatting data into a CSI packet, the processor uses the data type determined at block 1216 to set the Data ID field of the CSI packet.

As an illustrative example, if the processor determines at block 1216 that the data type corresponds to a frame start, the processor sets the Data ID field of the CSI packet to indicate the CSI packet includes a frame start and generates the CSI packet to include a frame start. As another illustrative example, if the processor determines at block 1216 that the data type corresponds to a frame end, the processor sets the Data ID field of the CSI packet to indicate the CSI packet includes a frame end and generates the CSI packet to include a frame end. As another illustrative example, if the processor determines at block 1216 that the data type corresponds to a line start, the processor sets the Data ID field of the CSI packet to indicate the CSI packet includes a line start and generates the CSI packet to include a line start. As another illustrative example, if the processor determines at block 1216 that the data type corresponds to a line end, the processor sets the Data ID field of the CSI packet to indicate the CSI packet includes a line end and generates the CSI packet to include a line end. As another illustrative example, if the processor determines at block 1216 that the data type corresponds to blanking interval information, the processor sets the Data ID field of the CSI packet to indicate the CSI packet includes blanking interval information and generates the CSI packet to include blanking interval information. As another illustrative example, if the processor determines at block 1216 that the data type corresponds to YUV data, the processor sets the Data ID field of the CSI packet to indicate the CSI packet includes YUV data and generates the CSI packet to include the YUV data. As another illustrative example, if the processor determines at block 1216 that the data type corresponds to RGB data, the processor sets the Data ID field of the CSI packet to indicate the CSI packet includes RGB data and generates the CSI packet to include the RGB data. As another illustrative example, if the processor determines at block 1216 that the data type corresponds to raw video data, the processor sets the Data ID field of the CSI packet to indicate the CSI packet includes raw video data and generates the CSI packet to include the raw video data.

In some embodiments and/or implementations, the data format that i) corresponds to a non-Ethernet PHY protocol, and/or ii) is recognized by an additional processor corresponds to a packet format that includes one or more packet fields that can be set to indicate a flow, among multiple flows, to which the packet belongs; and reformatting the data at block 1220 includes setting the one or more packet fields to a particular flow. For example, in some embodiments and/or implementations, the intermediate frame header includes flow identifier information that indicates a data flow, among multiple data flows, to which the data in the intermediate frame belongs, and the processor uses the flow identifier information in the intermediate frame header to set the one or more packet fields that indicate the flow. For example, CSI packets include a virtual channel field that includes flow identification information that indicates a data flow, among multiple data flows, to which data within the CSI packet belongs. In some embodiments and/or implementations reformatting the data at block 1220 include generating a CSI packet, the processor uses the flow identifier information in the intermediate frame header to set the virtual channel field of the CSI packet.

In some embodiments in which the processor reformats the data at block 1220 into a format that is recognized by the additional processor, the method 1200 optionally also includes: transmitting the data reformatted at block 1220 to the additional processor via a communication link. For example, the non-Ethernet PHY processor 188 transmits data to the processor 108 via the communication link 192/196/392/396/592/596, according to an embodiment.

In some embodiments, the data may be transmitted via one of multiple different communication links with the processor (e.g., the links 192 and 196 of FIG. 1; the links 392 and 396 of FIG. 3; and the links 592 and 596 of FIGS. 5), and the different communication links correspond to respective different types of data. Thus, in some embodiments in which the data may be transmitted via one of multiple different communication links, the processor determines via which communication link the data is to be transmitted based on the data type determined at block 1216.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a vehicular communication network, the method comprising:

receiving, at a processor, a packet that includes data corresponding to a sensor, the packet being in a first format defined by a camera serial interface (CSI) protocol of the Mobile Industry Processor Interface (MIPI) Alliance;

reformatting, at the processor, the packet in the first format defined by the CSI protocol to a second format that does not conform to any CSI protocol of the MIPI alliance, the reformatting including: i) selecting, based on a first field in the packet in the first format, a data type value from a set of multiple data type values corresponding to different respective types of data, ii) generating an intermediate frame that does not include the packet in the first format, the intermediate frame being generated to include a header in the second format and a payload in the second format, the payload including the data corresponding to the sensor, and iii) generating the header to include one or more second fields set to the data type value;

providing, by the processor, the intermediate frame to an Ethernet network interface;

encapsulating, at the Ethernet network interface, the intermediate frame in an Ethernet packet; and transmitting, by the Ethernet network interface, the Ethernet packet via an Ethernet link.

2. The method of claim 1, wherein reformatting the packet in the first format defined by the CSI protocol to the second format comprises:

selecting, based on a data identifier (ID) field in the packet in the first format, the data type value from the set of multiple data type values corresponding to different respective types of data, the set of multiple data type values including at least i) a first data type value corresponding to video data from a camera, and ii) a second data type value corresponding to non-video data.

3. The method of claim 2, wherein:

the processor is communicatively coupled to the sensor via multiple communication links;

the method further comprises determining, at the processor, a communication link, among the multiple communication links, via which the data corresponding to the sensor was received; and selecting the data type value from the set of multiple data type values comprises: selecting the data type value further based on the determined communication link, among the multiple communication link, via which the data corresponding to the sensor was received.

4. The method of claim 2, wherein the intermediate frame is a first intermediate frame, the header of the first intermediate frame is a first header, the payload of the first intermediate frame is a first payload, and the Ethernet packet is a first Ethernet packet, and wherein the method further comprises:

receiving, at the processor, one of i) general purpose input/output (GPIO) data corresponding to the sensor, ii) diagnostic data corresponding to the sensor, and iii) Operation and Management (OAM) data corresponding to the sensor;

generating, at the processor, a second intermediate frame to include a second header in the second format and a second payload in the second format, wherein generating the second intermediate frame includes:

selecting a data type value for the second intermediate frame from the set of multiple data type values, including selecting the data type value to be a value corresponding to the one of i) GPIO data, ii) diagnostic data, and iii) OAM data, generating the second header of the second intermediate frame in the second format to include one or more third fields set to the selected data type value to indicate a type of data included in the second payload of the second intermediate frame, and generating the second payload of the second intermediate frame to include the one of i) the GPIO data corresponding to the sensor, ii) the diagnostic data corresponding to the sensor, and iii) the OAM data corresponding to the sensor;

providing, by the processor, the second intermediate frame to the Ethernet network interface;

encapsulating, at the Ethernet network interface, the second intermediate frame in a second Ethernet packet; and transmitting, by the Ethernet network interface, the second Ethernet packet via the Ethernet link.

5. The method of claim 2, wherein the intermediate frame is a first intermediate frame, the header of the first intermediate frame is a first header, the payload of the first intermediate frame is a first payload, and the Ethernet packet is a first Ethernet packet, and wherein the method further comprises:

receiving, at the processor, data corresponding to the sensor in a user-defined format;

generating, at the processor, a second intermediate frame to include a second header in the second format and a second payload in the second format, wherein generating the second intermediate frame includes:

selecting a data type value for the second intermediate frame from the set of multiple data type values, including selecting the data type value to be a value indicating the second payload includes user-defined data, generating the second header of the second intermediate frame in the second format to include one or more third fields set to the selected data type value to indicate a type of data included in the second payload of the second intermediate frame, and generating the second payload of the second intermediate frame to include the data corresponding to the sensor in a user-defined format;

providing, by the processor, the second intermediate frame to the Ethernet network interface;

encapsulating, at the Ethernet network interface, the second intermediate frame in a second Ethernet packet; and transmitting, by the Ethernet network interface, the second Ethernet packet via the Ethernet link.

6. The method of claim 1, wherein the processor is a first processor, the header is a first header, the payload is a first payload, and the Ethernet network interface is a first Ethernet network interface, the method further comprising:

receiving, at a second Ethernet network interface, the Ethernet packet, the Ethernet packet received via the Ethernet link;

decapsulating, at the second Ethernet network interface, the intermediate frame from the Ethernet packet, the intermediate frame including the first header in the second format and the payload in the second format;

providing, by the second Ethernet network interface, the intermediate frame to a second processor; and generating, at the second processor, the packet in the first format defined by the CSI protocol of the MIPI Alliance, including i) using header information in the first header of the intermediate frame to populate one or more header fields of a second header of the packet in the first format, and ii) using payload information in the intermediate frame to generate a second payload of the packet in the first format.

7. The method of claim 6, wherein:

generating the packet in the CSI protocol format comprises using the data type value in the one or more fields of the first header to set a data identifier (ID) field in the second header of the packet in the first format.

8. The method of claim 7, wherein:
the first header of the intermediate frame includes i) a general data type field set to a general data type value from a set of multiple general data type values corresponding to different respective groups of types of data, and ii) a data sub-type field to a data sub-type value from a set of multiple data sub-type values, wherein the general data type value and the data sub-type value together indicates the type of data included in the first payload of the intermediate frame; and
using the data type value to set the data ID field in the second header comprises using the general data type value and the data sub-type value to set the data ID field in the second header.

9. The method of claim 8, wherein:
the general data type field is set to a general video type value to indicate the first payload of the intermediate frame includes video-type data;
the data sub-type field is set to a video data sub-type value to indicate a subtype of video data included in the first payload of the intermediate frame; and
using the data type value to set the data ID field in the second header comprises using the general video data type value and the video data sub-type value to set the data ID field in the second header.

10. The method of claim 6, wherein the Ethernet packet is a first Ethernet packet, the intermediate frame is a first intermediate frame, and the packet in the first format is a first packet, wherein the method further comprises:
receiving, at the second Ethernet network interface, a second Ethernet packet, the second Ethernet packet received via the Ethernet link;
decapsulating, at the Ethernet network interface, a second intermediate frame from the second Ethernet packet, the second intermediate frame including a third header in the second format and a third payload in the second format, the third payload including data corresponding to the sensor, wherein the third header of the second intermediate frame includes one or more fields set to a data type value that indicates a type of data included in the third payload of the second intermediate frame, the data type value from a set of multiple data type values corresponding to different respective types of data, the set of multiple data type values including a value that indicates the third payload is in a user-defined format;
providing, by the second Ethernet network interface, the second intermediate frame to the second processor; and
generating, at the second processor, a second packet, including i) using header information in the third header of the second intermediate frame to populate one or more header fields of a fourth header of the second packet, and ii) using payload information in the second intermediate frame to generate a fourth payload of the second packet.

11. The method of claim 6, wherein the Ethernet packet is a first Ethernet packet, the intermediate frame is a first intermediate frame, and the packet in the first format is a first packet, wherein the method further comprises:
receiving, at the second Ethernet network interface, a second Ethernet packet, the second Ethernet packet received via the Ethernet link;
decapsulating, at the second Ethernet network interface, a second intermediate frame from the second Ethernet packet, the second intermediate frame including a third header in the second format and a third payload in the second format, the third payload including data corresponding to the sensor, wherein the third header of the second intermediate frame includes one or more fields set to a data type value that indicates a type of data included in the third payload of the second intermediate frame, the data type value from a set of multiple data type values corresponding to different respective types of data, the set of multiple data type values including one or more of i) a first value corresponding to general purpose input/output (GPIO) data, ii) a second value corresponding to diagnostic data, and iii) and a third value corresponding to Operation and Management (OAM) data;
providing, by the second Ethernet network interface, the second intermediate frame to the second processor; and
generating, at the second processor, a second packet, including i) using header information in the third header of the second intermediate frame to populate one or more header fields of a fourth header of the second packet, and ii) using payload information in the second intermediate frame to generate a fourth payload of the second packet.

12. A communication device, comprising:
a processor configured to:
receive a packet that includes data corresponding to a sensor, the packet being in a first format defined by a camera serial interface (CSI) protocol of the Mobile Industry Processor Interface (MIPI) Alliance,
reformat the packet in the first format defined by the CSI protocol to a second format that does not conform to any CSI protocol of the MIPI alliance, the reformatting including: i) selecting, based on a first field in the packet in the first format, a data type value from a set of multiple data type values corresponding to different respective types of data, ii) generating an intermediate frame that does not include the packet in the first format, the intermediate frame being generated to include a header in the second format and a payload in the second format, the payload including the data corresponding to the sensor, and iii) generating the header to include one or more second fields set to the data type value, and
outputting the intermediate frame to an Ethernet network interface; and
an Ethernet network interface configured to:
receive the intermediate frame output by the processor,
encapsulate the intermediate frame in an Ethernet packet, and
transmit the Ethernet packet via an Ethernet link.

13. The communication device of claim 12, wherein the processor is configured to:
select, based on a data identifier (ID) field in the packet in the first format, the data type value from the set of multiple data type values corresponding to different respective types of data, the set of multiple data type values including at least i) a first data type value corresponding to video data from a camera, and ii) a second data type value corresponding to non-video data.

14. The communication device of claim 13, wherein the processor is communicatively coupled to the sensor via multiple communication links, and wherein the processor is further configured to:
determine a communication link, among the multiple communication links, via which the data corresponding to the sensor was received; and select the data type value further based on the determined communication link, among the multiple communication link, via which the data corresponding to the sensor was received.

15. The communication device of claim 13, wherein the intermediate frame is a first intermediate frame, the header of the first intermediate frame is a first header, the payload of the first intermediate frame is a first payload, and the Ethernet packet is a first Ethernet packet, and wherein:
the processor is further configured to:
receive one of i) general purpose input/output (GPIO) data corresponding to the sensor, ii) diagnostic data corresponding to the sensor, and iii) Operation and Management (OAM) data corresponding to the sensor, and
generate a second intermediate frame to include a second header in the second format and a second payload in the second format, wherein generating the second intermediate frame includes:
selecting a data type value for the second intermediate frame from the set of multiple data type values, including selecting the data type value to be a value corresponding to the one of i) GPIO data, ii) diagnostic data, and iii) OAM data,
generating the second header of the second intermediate frame in the second format to include one or more third fields set to the selected data type value to indicate a type of data included in the second payload of the second intermediate frame, and
generating the second payload of the second intermediate frame to include the one of i) the GPIO data corresponding to the sensor, ii) the diagnostic data corresponding to the sensor, and iii) the OAM data corresponding to the sensor;
the processor is further configured to output the second intermediate frame; and
the Ethernet network interface is further configured to:
receive the second intermediate from the processor,
encapsulate the second intermediate frame in a second Ethernet packet, and
transmit the second Ethernet packet via the Ethernet link.

16. The communication device of claim 13, wherein the intermediate frame is a first intermediate frame, the header of the first intermediate frame is a first header, the payload of the first intermediate frame is a first payload, and the Ethernet packet is a first Ethernet packet, and wherein:
the processor is further configured to:
receive data corresponding to the sensor in a user-defined format, and
generate a second intermediate frame to include a second header in the second format and a second payload in the second format, wherein generating the second intermediate frame includes:
selecting a data type value for the second intermediate frame from the set of multiple data type values, including selecting the data type value to be a value indicating the second payload includes user-defined data,
generating the second header of the second intermediate frame in the second format to include one or more third fields set to the selected data type value to indicate a type of data included in the second payload of the second intermediate frame, and
generating the second payload of the second intermediate frame to include the data corresponding to the sensor in a user-defined format;
the processor is further configured to output the second intermediate frame; and
the Ethernet network interface is further configured to:
receive the second intermediate from the processor,
encapsulate the second intermediate frame in a second Ethernet packet, and
transmit the second Ethernet packet via the Ethernet link.

17. A system comprising the communication device of claim 12, wherein the communication device is a first communication device, the processor is a first processor, the header is a first header, the payload is a first payload, and the Ethernet network interface is a first Ethernet network interface, wherein the system further comprises a second communication device coupled to the first communication device via the Ethernet link, the second communication device comprising:
a second Ethernet network interface configured to:
receive the Ethernet packet via the Ethernet link;
decapsulate the intermediate frame from the Ethernet packet, the intermediate frame including the first header in the second format and the first payload in the second format, and
output the intermediate frame; and
a second processor coupled to the second Ethernet network interface, the second processor configured to:
receive the intermediate frame output by the second Ethernet network interface, and
generate the packet in the first format, including i) using header information in the first header of the intermediate frame to populate one or more header fields of a second header of the packet in the first format, and ii) using payload information in the intermediate frame to generate a second payload of the packet in the first format.

18. The system of claim 17, wherein:
the second processor is further configured to use the data type value in the one or more fields of the first header to set a data identifier (ID) field in the second header of the packet in the first format.

19. The system of claim 18, wherein:
the first header of the intermediate frame includes i) a general data type field set to a general data type value from a set of multiple general data type values corresponding to different respective groups of types of data, and ii) a data sub-type field to a data sub-type value from a set of multiple data sub-type values, wherein the general data type value and the data sub-type value together indicates the type of data included in the first payload of the intermediate frame; and
the second processor is configured to use the general data type value and the data sub-type value to set the data ID field in the second header.

20. The system of claim 19, wherein:
the general data type field is set to a general video type value to indicate the first payload of the intermediate frame includes video-type data;
the data sub-type field is set to a video data sub-type value to indicate a subtype of video data included in the first payload of the intermediate frame; and
the second processor is configured to use the general video data type value and the video data sub-type value to set the data ID field in the second header.

21. The system of claim 17, wherein the Ethernet packet is a first Ethernet packet, the intermediate frame is a first intermediate frame, and the packet in the first format is a first packet, and wherein:

the second Ethernet network interface configured to:
  receive a second Ethernet packet via the Ethernet link,
  decapsulate a second intermediate frame from the second Ethernet packet, the second intermediate frame including a third header in the second format and a third payload in the second format, the third payload including data corresponding to the sensor, wherein the third header of the second intermediate frame includes one or more fields set to a data type value that indicates a type of data included in the third payload of the second intermediate frame, the data type value from a set of multiple data type values corresponding to different respective types of data, the set of multiple data type values including one or more of i) a first value corresponding to general purpose input/output (GPIO) data, ii) a second value corresponding to diagnostic data, and iii) and a third value corresponding to Operation and Management (OAM) data, and
  output the second intermediate frame; and
the second processor is further configured to:
  receive the second intermediate frame output by the second Ethernet network interface, and
  generate a second packet, including i) using header information in the third header of the second intermediate frame to populate one or more header fields of a fourth header of the second packet, and ii) using payload information in the second intermediate frame to generate a fourth payload of the second packet.

22. The system of claim 17, wherein the Ethernet packet is a first Ethernet packet, the intermediate frame is a first intermediate frame, and the packet in the first format is a first packet, and wherein:
the second Ethernet network interface configured to:
  receive a second Ethernet packet via the Ethernet link;
  decapsulate a second intermediate frame from the second Ethernet packet, the second intermediate frame including a third header in the second format and a third payload in the second format, the third payload including data corresponding to the sensor, wherein the third header of the second intermediate frame includes one or more fields set to a data type value that indicates a type of data included in the third payload of the second intermediate frame, the data type value from a set of multiple data type values corresponding to different respective types of data, the set of multiple data type values including a value that indicates the third payload is in a user-defined format, and
  output the second intermediate frame; and
the second processor is further configured to:
  receive the second intermediate frame output by the second Ethernet network interface, and
  generate a second packet, including i) using header information in the third header of the second intermediate frame to populate one or more header fields of a fourth header of the second packet, and ii) using payload information in the second intermediate frame to generate a fourth payload of the second packet.

* * * * *